United States Patent
Kapur et al.

(10) Patent No.: US 12,544,553 B2
(45) Date of Patent: Feb. 10, 2026

(54) SYSTEMS AND METHODS FOR LEFT VENTRICULAR UNLOADING IN TREATING MYOCARDIAL INFARCTION

(71) Applicants: Tufts Medical Center, Inc., Boston, MA (US); Abiomed, Inc., Danvers, MA (US)

(72) Inventors: Navin K. Kapur, Boston, MA (US); Richard H. Karas, Franklin, MA (US); Noam Josephy, Danvers, MA (US)

(73) Assignees: Tufts Medical Center, Inc., Boston, MA (US); Abiomed, Inc., Danvers, MA (US)

( * ) Notice: Subject to any disclaimer, the term of this patent is extended or adjusted under 35 U.S.C. 154(b) by 0 days.

(21) Appl. No.: 18/130,696

(22) Filed: Apr. 4, 2023

(65) Prior Publication Data

US 2023/0355952 A1  Nov. 9, 2023

Related U.S. Application Data

(63) Continuation of application No. 16/244,998, filed on Jan. 10, 2019, now abandoned.
(Continued)

(51) Int. Cl.
*A61M 60/00* (2021.01)
*A61M 60/113* (2021.01)
(Continued)

(52) U.S. Cl.
CPC ........ *A61M 60/148* (2021.01); *A61M 60/113* (2021.01); *A61M 60/117* (2021.01);
(Continued)

(58) Field of Classification Search
None
See application file for complete search history.

(56) References Cited

U.S. PATENT DOCUMENTS

| 6,217,541 B1 | 4/2001 | Yu |
| 8,721,517 B2 | 5/2014 | Zeng et al. |
| 9,327,068 B2 | 5/2016 | Aboul-Hosn et al. |
| | (Continued) | |

FOREIGN PATENT DOCUMENTS

| AU | 2013254682 B2 | 6/2017 |
| CN | 102665785 A | 9/2012 |
| | (Continued) | |

OTHER PUBLICATIONS

The Impella to Balloon (ITB) Strategy Limits Infarct Size and Improves Survival in Acute Myocardial Infarction Complicated by Cardiogenic Shock: A Bench to Bedside Study (Year: 2015).*
(Continued)

*Primary Examiner* — Sana Sahand
(74) *Attorney, Agent, or Firm* — Botos Churchill IP Law LLP

(57) ABSTRACT

We provide herein a method of preventing or limiting the effects of heart failure in a human patient that has sustained myocardial infarction by reducing maladaptive cardiac remodeling in the patient. The method comprises percutaneously inserting a transvalvular blood pump, comprising a rotor and a cannula, into the patient's vasculature and positioning the cannula across the aortic valve of the patient's heart, with a distal end of the cannula located in the left ventricle of the heart and a proximal end of the pump located in the aorta. The method then comprises, prior to reperfusing the heart, operating the positioned pump to unload the left ventricle at a pumping rate of at least 2.5 L/min of blood flow for a support period between at least 30 minutes and less than 60 minutes. Then, after the support period, the method comprises applying coronary reperfusion therapy to the heart.

22 Claims, 18 Drawing Sheets

Related U.S. Application Data

(60) Provisional application No. 62/758,164, filed on Nov. 9, 2018, provisional application No. 62/732,936, filed on Sep. 18, 2018, provisional application No. 62/615,462, filed on Jan. 10, 2018.

(51) Int. Cl.
    *A61M 60/117* (2021.01)
    *A61M 60/13* (2021.01)
    *A61M 60/139* (2021.01)
    *A61M 60/148* (2021.01)
    *A61M 60/17* (2021.01)
    *A61M 60/216* (2021.01)
    *A61M 60/295* (2021.01)
    *A61M 60/38* (2021.01)
    *A61M 60/422* (2021.01)
    *A61M 60/857* (2021.01)

(52) U.S. Cl.
    CPC .......... *A61M 60/13* (2021.01); *A61M 60/139* (2021.01); *A61M 60/17* (2021.01); *A61M 60/216* (2021.01); *A61M 60/295* (2021.01); *A61M 60/38* (2021.01); *A61M 60/422* (2021.01); *A61M 60/857* (2021.01)

(56) References Cited

U.S. PATENT DOCUMENTS

| | | |
|---|---|---|
| 2004/0034272 A1 | 2/2004 | Diaz et al. |
| 2004/0193138 A1 | 9/2004 | Levin et al. |
| 2005/0085683 A1 | 4/2005 | Bolling et al. |
| 2005/0215533 A1 | 9/2005 | Gottlieb et al. |
| 2008/0097385 A1* | 4/2008 | Vinten-Johansen ........... A61K 31/166 604/509 |
| 2013/0303830 A1 | 11/2013 | Zeng et al. |
| 2015/0073202 A1 | 3/2015 | Aboul-Hosn et al. |
| 2016/0129233 A1* | 5/2016 | Hoffmann ................. A61B 8/08 604/22 |
| 2016/0296598 A1 | 10/2016 | Zeng et al. |
| 2016/0303197 A1 | 10/2016 | Sandrasagra et al. |
| 2018/0078159 A1* | 3/2018 | Edelman ............... A61B 5/0215 |
| 2020/0324033 A1* | 10/2020 | Agah ................... A61M 60/857 |

FOREIGN PATENT DOCUMENTS

| | | | |
|---|---|---|---|
| CN | 107096118 | A | 8/2017 |
| JP | H0999060 | A | 4/1997 |
| JP | 2005095667 | A | 4/2005 |
| JP | 2008253707 | A | 10/2008 |
| JP | 2010195792 | A | 9/2010 |
| JP | 2015514531 | A | 5/2015 |
| KR | 20150008133 | A | 1/2015 |
| WO | 2011056980 | A2 | 5/2011 |
| WO | 2017165372 | A1 | 9/2017 |

OTHER PUBLICATIONS

Office Action from Korean Patent Application No. 10-2020-7023092 dated Jul. 14, 2023 (14 pp.).
Office Action from Israeli Patent Application No. 275919 dated Nov. 1, 2023 (4 pp.).
Office Action issued in Australian Patent Application No. 2019206536 dated Nov. 3, 2023 (3 pp.).
Office Action issued in Japanese Patent Application No. 2020-538144 dated Nov. 9, 2023 (11 pp.).
Office Action from Israeli Patent Application No. 275919 dated Apr. 30, 2023 (4 pp.).
Esposito et al. "Left Ventricular Unloading Before Reperfusion Promotes Functional Recovery After Acute Myocardial Infarction." J Am Coll Cardiol. vol. 72. No. 5. 2018: 501-14.
Extended European Search Report for European Application No. 19738326.8 dated Aug. 25, 2021 (10 pp.).
Impella Ventricular Support Systems for Use During Cardiogenic Shock and High-Risk PCI Instructions for Use and Clinical Reference Manual, Abiomed, Inc. 2017: entire document.
International Preliminary Report on Patentability for Application No. PCT/US2019/051642 dated Apr. 1, 2021 (10 pp.).
International Search Report and Written Opinion from corresponding International Application No. PCT/US2019/013025 dated Apr. 30, 2019 (18 pp.).
International Search Report and Written Opinion from corresponding International Application No. PCT/US2019/051642 dated Dec. 12, 2019 (18 pp.).
International Search Report and Written Opinion from corresponding International Application No. PCT/US2019/060411 dated Feb. 14, 2020 (19 pp.).
Kapur et al. "Mechanical Pre-Conditioning With Acute Circulatory Support Before Reperfusion Limits Infarct Size in Acute Myocardial Infarction." J Am Coll Cardiol. vol 3. No. 11. 2015: 873-82.
Kapur et al. "Mechanically Unloading the Left Ventricle Before Coronary Reperfusion Reduces Left Ventricular Wall Stress and Myocardial Infarct Size." Circulation. vol. 128. 2013: 328-36.
Kapur et al. "The Impella to Balloon (ITB) Strategy Limits Infarct Size and Improves Survival in Acute Myocardial Infarction Complicated by Cardiogenic Shock: A Bench to Bedside Study." J Am Coll Cardiol. vol. 66. No. 15. Suppl B. 2015: B95-6.
Konstantinidis et al. "Mechanisms of Cell Death in Heart Disease." Arterioscler Thromb Vasc Biol. vol. 32. 2012: 1552-62.
Meyns et al. "Left Ventricular Support by Catheter-Mounted Axial Flow Pump Reduces Infarct Size." J Am Coll Cardiol. vol. 41. No. 7. 2003: 1087-95.
Minamino, T. "Cardioprotection From Ischemia/Reperfusion Injury—Basic and Translational Research." Circ J. vol. 76. 2012: 1074-82.
Office Action from corresponding Indian Application No. 202017032958 dated Jul. 5, 2022 (10 pp.).
Office Action from corresponding Japanese Patent Application No. 2020-538144 dated Mar. 1, 2023 (11 pp.).
Office Action issued in corresponding Chinese Patent Application No. 201980018400.6 dated Jan. 13, 2023 (23 pp.).
O'Neill et al. "The Current Use of Impella 2.5 in Acute Myocardial Infarction Complicated by Cardiogenic Shock: Results from the USpella Registry." J Intervent Cardiol. vol. 27. No. 1. 2014: 1-11.
Relevance of Brain Natriuretic Peptide in Preload-Dependent Regulation of Cardiac Sarcoplasmic Reticulum Ca2+ ATPase Expression; Kroger et al. pp. 2724-2732 (Year: 2006).
Sanada et al. "Pathophysiology of myocardial reperfusion injury: preconditioning, postconditioning, and translational aspects of protective measures." Am J Physical Heart Circ Physiol. vol. 301. 2011: H1723-41.
Thiele et al. "Intraaortic Balloon Support for Myocardial Infarction with Cardiogenic Shock." N Engl J Med. vol. 367. No. 14. 2012: 1287-96.
Uriel et al. "Mechanical Unloading in Heart Failure." J Am Coll Cardiol. vol. 72. No. 5. 2018: 569-80.
Office Action from Chinese Patent Application No. 201980018400.6 dated Sep. 16, 2023 (16 pp.).
Office Action from Japanese Patent Application No. 2020-538144, dated May 31, 2024 (11 pp.).
Federation of Chinese Medical institutions, "A Cardiovascular Medicine, a pump catheter for the latest medical devices, IMPELLA (impeller)," (Nov. 2021) (accessed by Japanese Patent Office on Reiwa 6(2024) May 22 at http://www.amc1.jp/departments/diagnosis/jyunkankika/2021/11/post-48.Shtml).
Office Action issued in Israeli Patent Application No. 275919, dated Aug. 8, 2024 (4 pp.).
Office Action from Japanese Patent Application No. 2020-538144 dated Dec. 4, 2024 (6 pp.).
Office Action from Korean Patent Application No. 10-2024-7016008 dated Dec. 6, 2024 ( pp.).
Decision to Grant for Japanese Patent Application No. 2020-538144, dated Mar. 17, 2025 (7 pp.).

(56) References Cited

OTHER PUBLICATIONS

Office Action from New Zealand Patent Application No. 807265 dated Jul. 30, 2025, 2 Pages.
Office Action from New Zealand Patent Application No. 807268 dated Jul. 30, 2025, 2 Pages.
Office Action from New Zealand Patent Application No. 807269 dated Jul. 30, 2025, 2 Pages.
Office Action from New Zealand Patent Application No. 807270 dated Jul. 30, 2025, 3 Pages.
Office Action from New Zealand Patent Application No. 807271 dated Jul. 30, 2025, 3 Pages.
Office Action from New Zealand Patent Application No. 806962 dated Jul. 30, 2025, 4 Pages.
Office Action issued in European Patent Application No. 19 738 326.8 dated Oct. 17, 2025 (6 pp.).
Office Action from Israeli Patent Application No. 320637 dated Dec. 8, 2025 (4 pp.).

\* cited by examiner

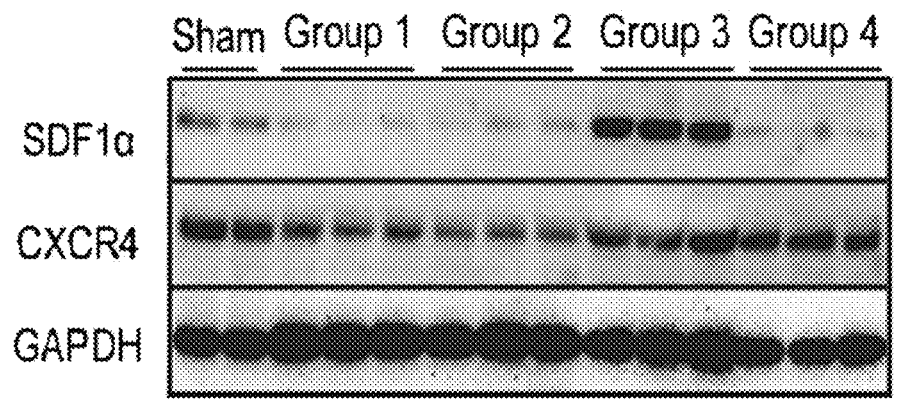
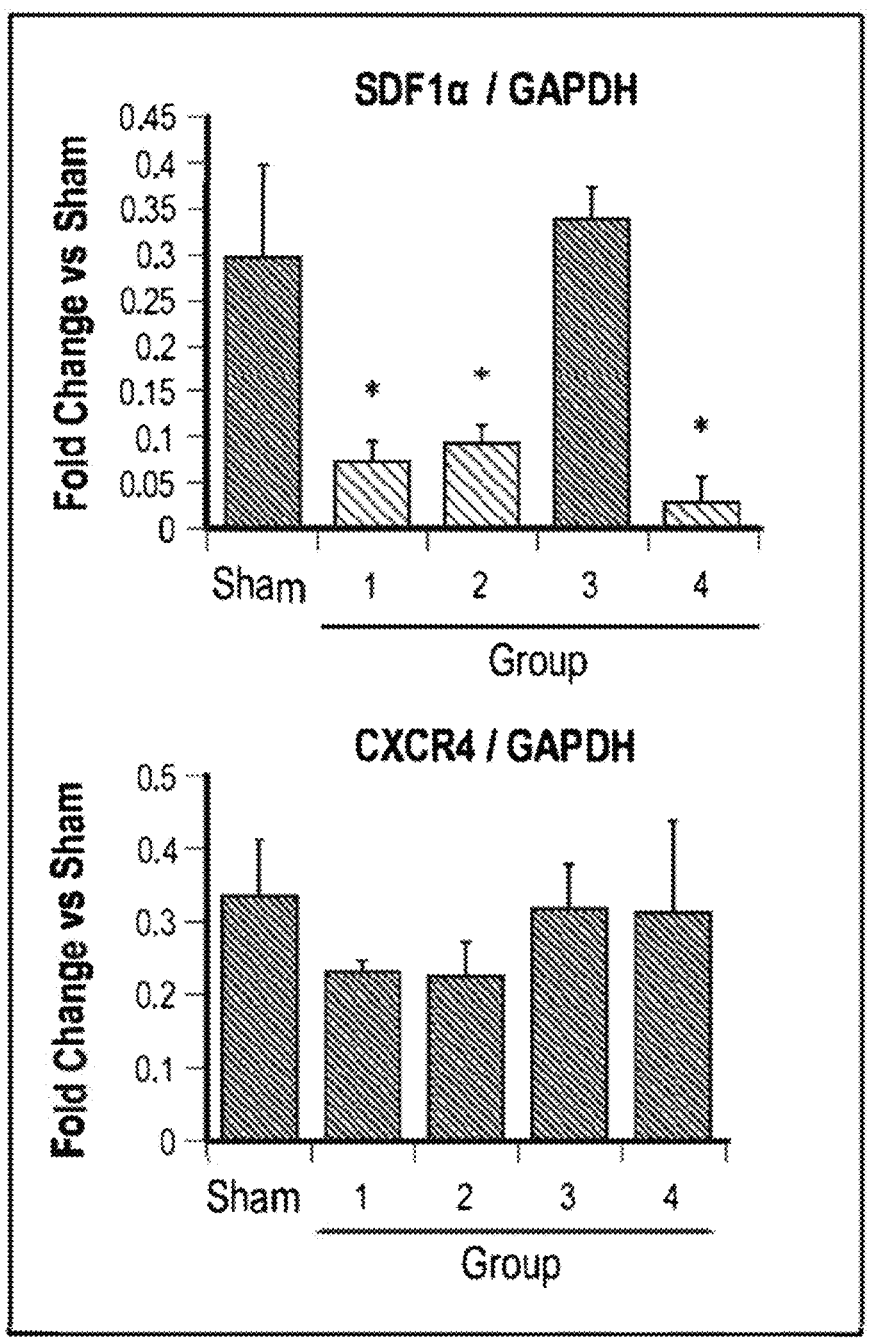
FIG. 8A
FIG. 8B

SYSTEMS AND METHODS FOR LEFT VENTRICULAR UNLOADING IN TREATING MYOCARDIAL INFARCTION

CROSS-REFERENCE TO RELATED APPLICATIONS

This application is a continuation of U.S. patent application Ser. No. 16/244,998, filed Jan. 10, 2019, now abandoned, which application claims the benefit of priority under 35 U.S.C. § 119 (e) from U.S. Provisional Application Ser. No. 62/615,462 filed Jan. 10, 2018, U.S. Provisional Application Ser. No. 62/732,936 filed Sep. 18, 2018, and U.S. Provisional Application Ser. No. 62/758,164 filed Nov. 9, 2018, the contents of all of which are hereby incorporated by reference in their entirety.

BACKGROUND OF THE INVENTION

Acute myocardial infarction (AMI) due to occlusion of a coronary artery is a major cause of global morbidity and mortality in humans. The current paradigm for AMI therapy focuses on primary reperfusion, which rapidly restores coronary artery blood flow as soon as possible after AMI, to re-establish myocardial oxygen supply. However, despite timely reperfusion, up to 25% of patients experiencing their first AMI will develop heart failure (HF) within a year. Contemporary ST-segment elevation AMI (STEMI) in-hospital management focuses on reducing door to balloon (DTB) time to reduce infarct size. However, despite intense resource allocation to achieve DTB times under 90 minutes, the incidence of post-AMI heart failure remains high. For every 5% increase in myocardial infarct size, 1-year all-cause mortality and HF hospitalizations increase by 20%, which imposes a significant burden on healthcare resources. For these reasons, new approaches to limit myocardial damage and subsequent ischemic HF remain a significant unmet need for AMI patients.

One explanation for these poor outcomes is that primary reperfusion paradoxically may worsen myocardial damage, known as ischemia-reperfusion injury (IRI). Prior attempts to limit IRI include vascular conditioning approaches to activate reperfusion injury salvage kinase (RISK) pathway activity and pharmacologic approaches, but the clinical benefit of those approaches has not necessarily been optimal. A critical barrier to these cardioprotective strategies is the requirement for rapid coronary reperfusion-they potentially leave insufficient time for any therapeutic impact on myocardial injury. Thus there exists a need for improved strategies to limit myocardial damage by promoting cardioprotective mechanisms that reduce or eliminate IRI.

Over the past decade, there has been an increasing reliance on mechanical support devices in routine clinical practice. Support devices include percutaneously delivered transvalvular axial-flow pumps (TV-Pumps), intra-aortic balloon pumps, intra-corporeal axial flow catheters and extracorporeal membrane oxygenation (ECMO) pumps, and have become popular in the treatment of myocardial injury. In the case of TV-pumps, such devices assist with the mechanical pumping of blood out of the left ventricle of the heart and thereby unload the heart, rapidly reducing left ventricular (LV) wall stress, stroke work, and myocardial oxygen demand, while augmenting systemic mean arterial pressure without the need for surgery. However, it has been reported that the use of TV-pumps alone did not significantly reduce 30-day mortality in patients with cardiogenic shock, and, instead, complicated acute myocardial infarction in certain patients (H. Thiele, "Intraaortic Balloon Support for Myocardial Infarction with Cardiogenic Shock", New England Journal of Medicine, Oct. 4, 2012, vol. 367, No. 14, pp. 1287-1296).

It has been proposed that a combination of mechanical support and Primary Reperfusion may limit myocardial damage in AMI patients. It has been reported that by first unloading the LV using a TV-Pump while delaying coronary reperfusion (Primary Unloading) reduces myocardial infarct size by 40-50% and increases myocardial levels of the cardioprotective chemokine stromal derived factor $1\alpha$ (SDF-$1\alpha$) (N. Kapur, "Mechanical PreConditioning with Acute Circulatory Support Before Reperfusion Limits Infarct Size in Acute Myocardial Infarction," JACC: Heart Failure, vol. 3 no. 11, November 2015).

A preliminary swine model of AMI model has been studied to compare primary reperfusion therapy with therapy that delays reperfusion therapy until after unloading the left atrium using a percutaneously delivered extracorporeal, centrifugal pump, with initial indications that delaying coronary reperfusion (P-unloading) may reduce myocardial injury. Another study has applied a percutaneously delivered transvalvular pump directly into the left ventricle of an animal and observed unloading implications when delaying coronary reperfusion for 60 min. The implications for treating MI in humans has not been well understood.

BRIEF SUMMARY OF THE INVENTION

The present disclosure relates to an improved method of supporting a human patient's heart that has sustained myocardial infarction, with the surprising result that the sequence and timing of applying support to the heart prior to reperfusion can improve the heart and reduce the impact of an infarction. The technology can be further applied to prevent or limit the effects of heart failure in a human patient. This can be done by, for example, reducing maladaptive cardiac remodeling in the patient. The method (and systems configured for application) stabilizes or reduces the size of the infarct, which is beneficial to the patient's heart. Certain applications include applying a mechanical circulatory support device to reduce the size of an infarct: some application include applying reperfusion therapy after a period of delay wherein the heart is supported with a mechanical circulatory device. In general, the method is applied by taking a counter approach to conventional modes and theories in the field—rather than immediately applying reperfusion therapy to a patient that has suffered a heart attack, the method (and systems) first supports the heart by reducing myocardial oxygen demand (e.g., by unloading the heart) for a period of time and then, after that support period, restores the oxygen supply to the affected area of the heart (e.g., by reperfusion). The methods thus seek to reduce the time between an AMI and the initiation of mechanical circulatory support, such period referred to conveniently, as the "door to unload." It has been found that taking such an approach can increase the myocardial salvage of the human heart and reduce the size of the infarct in the human heart. Additionally, such an approach has the surprising effect of preventing or limiting the effects of heart failure in a human patient by, for example, reducing maladaptive cardiac remodeling in the patient.

According to an embodiment of the present disclosure, there is provided a method of supporting a human patient's heart. The method comprises the steps of (i) inserting a mechanical circulatory support device into the human patient after the myocardial infarction, (ii) prior to reperfusing the heart, operating the mechanical circulatory support device for a defined support time (the support period), and (iii) after the support period, applying reperfusion therapy to the heart (e.g., inserting a stent, or applying drug therapy to free a narrowed or occluded area in the coronary vasculature). The support period is preferably longer than 15 minutes. For example, the support period may be least 30 minutes and less than 60) minutes. The mechanical circulatory support device is a cardiac assist device that operates to pump at a rate of at least 2.5 L/min of blood flow.

According to another embodiment of the present disclosure, there is provided a method of supporting a patient's heart that has sustained myocardial infarction. The method comprises the step of percutaneously inserting a transvalvular blood pump into the patient and positioning the pump across the aortic valve of the patient's heart, with a distal end of the pump located in the left ventricle of the heart. Then, prior to re-perfusing the heart, the method proceeds with the step of operating the positioned pump to unload the left ventricle at a pumping rate of at least 2.5 L/min of blood flow for a pumping period of greater than 15 minutes. After the pumping period, the method then comprises the step of treating the heart with re-perfusion therapy.

According to a further embodiment of the present disclosure, there is provided a method of reducing the size of a myocardial infarction scar in a patient's heart. The method comprises the step of percutaneously inserting a transvalvular microaxial blood pump into the patient, and positioning the pump across the aortic valve of the patient's heart with a distal end of the pump located in the left ventricle of the heart. The method then comprises, prior to re-perfusing the heart, operating the positioned pump to unload the left ventricle for a pumping period of longer than 15 minutes at a pumping rate of at least 2.5 L/min of blood flow. After the pumping period, the method comprises applying reperfusion therapy to the heart.

According to another embodiment of the present disclosure, there is provided a method of supporting a myocardial infarcted heart. The method comprises percutaneously inserting a mechanical circulatory support device into the patient after myocardial infarction of the patient's heart, prior to re-perfusing the heart, operating the device to unload the left ventricle at a rate of at least 2.5 L/min of blood flow (e.g., 3.5 L/min) for an unloading period of longer than 15 minutes, and after the unloading period, applying reperfusion therapy to the heart.

According to another embodiment of the present disclosure, there is provided a method of supporting a patient's heart with a myocardial infarction. The method comprises the steps of (i) reducing levels of BAX protein and active Caspase-3 antibody in patient cardiac tissue in the myocardial infarction area (the area at risk), and (ii) increasing levels of BCL-2 and BCL-XL proteins in patient cardiac tissue in the myocardial infarction area.

According to another embodiment of the present disclosure, there is provided a method of supporting a patient's heart with a myocardial infarction comprising at least one of (i) reducing levels of BAX protein and active Caspase-3 antibody in patient cardiac tissue near the myocardial infarction, (ii) increasing levels of BCL-2 and BCL-XL proteins in patient cardiac tissue in the myocardial infarction area, (iii) increasing stromal derived factor 1α (SDF-1α) protein levels in patient cardiac tissue in the myocardial infarction area, (iv) maintaining activity levels of MMP-2 and MMP-9 enzymes in patient cardiac tissue in the myocardial infarction area. (v) limiting upregulation of DPP-4 protein expression and activity in patient cardiac tissue near the myocardial infarction, (vi) reducing circulating levels of brain natriuretic peptide (BNP) in the patient's blood, (vii) increasing mRNA levels of SERCA expression in patient cardiac cells near the myocardial infarction, and (viii) reducing levels of calcineurin activity and Type I collagen in the myocardial infarction area while maintaining levels of b-MHC in the non-infarct region of the patient's heart.

According to another embodiment of the present disclosure, there is provided a method of supporting a patient's heart with a myocardial infarction comprising increasing stromal derived factor 1α (SDF-1α) protein levels in patient cardiac tissue near the myocardial infarction. The method may comprise maintaining activity levels of MMP-2 and MMP-9 enzymes in patient cardiac tissue in the myocardial infarction area. The method may also comprise limiting upregulation of DPP-4 protein expression and activity in patient cardiac tissue in the myocardial infarction area. Such methods may be performed with a mechanical circulatory support device, such as a transvalvular or extracorporeal pump.

According to further embodiment of the present disclosure, there is provided a method of supporting a patient's heart with a myocardial infarction comprising reducing circulating levels of brain natriuretic peptide (BNP) in the patient's blood. The method also comprises increasing mRNA levels of SERCA expression in patient cardiac tissue in the myocardial infarction area. The method further comprises reducing levels of calcineurin activity and Type I collagen in patient cardiac tissue near the myocardial infarction while maintaining levels of b-MHC in the non-infarct region of the patient's heart.

According to another embodiment of the present disclosure, there is provided a method of supporting a patient's heart with a myocardial infarction comprising (i) reducing levels of BAX protein and active Caspase-3 antibody in patient cardiac tissue in the myocardial infarction area, (ii) increasing levels of BCL-2 and BCL-XL proteins in patient cardiac tissue in the myocardial infarction area. (iii) increasing stromal derived factor 1α (SDF-1α) protein levels in patient cardiac tissue in the myocardial infarction area. (iv) maintaining activity levels of MMP-2 and MMP-9 enzymes in patient cardiac tissue in the myocardial infarction area, (v) limiting upregulation of DPP-4 protein expression and activity in patient cardiac tissue in the myocardial infarction area. (vi) reducing circulating levels of brain natriuretic peptide (BNP) in the patient's blood, (vii) increasing mRNA levels of SERCA expression in patient cardiac cells in the myocardial infarction area, and (viii) reducing levels of calcineurin activity and Type I collagen in patient cardiac tissue in the myocardial infarction area while maintaining levels of b-MHC in the non-infarct region of the patient's heart.

According to an embodiment of the present disclosure, there is provided a cardioprotective system for supporting a patient's heart that has sustained myocardial infarction. The system comprises a mechanical circulatory support device configured to be inserted into the patient, and a reperfusion therapy device. The system is configured such that prior to operating the reperfusion therapy device, the mechanical circulatory support device is configured to operate for a support period of greater than 15 minutes at a rate of at least 2.5 L/min of blood flow.

According to another embodiment of the present disclosure, there is provided a cardioprotective system for supporting a patient's heart that has sustained myocardial infarction. The system comprises a blood pump configured to be percutaneously inserted into the patient after the myocardial infarction, the pump sized and shaped to be positioned across the aortic valve of the patient's heart, with a distal end of the pump configured to be located in the left ventricle of the heart. The system also comprise a reperfusion therapy device. The system is configured such that the blood pump is programmed to be operated prior to operating the reperfusion therapy device and thereafter pump blood at a rate of at least 2.5 L/min of blood flow for a pumping period of longer than 15 minutes.

According to a further embodiment of the present disclosure, there is provided a method of treating a human heart that has sustained myocardial infarction, the myocardial infarction having an infarct size and positioned within a portion of the heart, the method comprising reducing the infarct size.

According to another embodiment of the present disclosure, there is provided a method of preventing or limiting the effects of heart failure in a human patient that has sustained myocardial infarction by reducing maladaptive cardiac remodeling in the patient. Adaptations of the method comprise percutaneously inserting a transvalvular blood pump, comprising a rotor and a cannula, into the patient's vasculature and positioning the cannula across the aortic valve of the patient's heart, with a distal end of the cannula located in the left ventricle of the heart and a proximal end of the pump located in the aorta. Prior to reperfusing the heart, the method then comprises the step of operating the positioned pump to unload the left ventricle at a pumping rate of at least 2.5 L/min of blood flow for a support period between at least 30 minutes and less than 60 minutes. After the support period, the method then comprise the step of applying coronary reperfusion therapy to the heart. Maladaptive cardiac remodeling includes, but is not limited to, one or more of: changes in the size, shape, structure, and function of the heart.

According to a further embodiment of the present disclosure, there is provided a system for preventing or limiting the effects of heart failure in a human patient that has sustained myocardial infarction by reducing maladaptive cardiac remodeling in the patient. The system comprises a blood pump, comprising a rotor and a cannula, the blood pump configured to be percutaneously inserted into the patient's vasculature such that the cannula is positioned across the aortic valve of the patient's heart, with a distal end of the cannula located in the left ventricle of the heart and a proximal end of the pump located in the aorta. The system may additionally comprise a controller coupled to the pump so as to control the operation of the pump. The system also comprises a coronary reperfusion therapy device. In this embodiment, the controller programs the blood pump to unload the left ventricle at a pumping rate of at least 2.5 L/min of blood flow for a support period between at least 30 minutes and less than 60 minutes prior to operating the coronary reperfusion therapy device.

In certain implementations, the support period is about 30 minutes, or may be between 15 and 30 minutes. In some implementations, the support period is longer than 30 minutes or longer than 45 minutes. In some implementations, the mechanical circulatory support device pumps at a rate of at least 3.5 L/min of blood flow. In certain implementations the device provides a cannula placed into the patient's heart and pumps blood through the cannula. In some implementations the device is a microaxial blood pump with a motor and an onboard rotor and stator that mechanically operates to pump blood from the heart: in some implementations the device operates by an external motor and may deploy the pump motor external to the patient and rely on a long cannula extending through the patient's vasculature to the heart. An example of a suitable mechanical circulatory support device is a transvalvular microaxial pump (e.g., an Impella®; blood pump, such as the Impella CP, or a similar device), where the pump is inserted percutaneously or surgically into the aorta and across the aortic valve, allowing the pump to pump blood out of the left ventricle and thereby "unload" the left ventricle. In some adaptations, the method includes percutaneously inserting a transvalvular micro axial pump blood pump (TV pump), comprising a rotor and a cannula, into the patient's vasculature and positioning the cannula across the aortic valve of the patient's heart, with a distal end of the cannula located in the left ventricle of the heart and a proximal end of the pump located in the aorta. An extracorporeal pump may also be used (e.g., Tandem Heart) to unload a heart chamber (such as an atria or ventricle) according to methods disclosed herein. Left or right atria may be unloaded, as may the right ventricle.

In certain implementations, the heart is unloaded by the mechanical circulatory support device concurrently with reperfusion (for example, after unloading the heart). The period of unloading can be at least 30 minutes, 3 hours, or longer. Various mechanical circulatory support devices may be used in the method of the present disclosure, either alone or in combination. For example an intra-aortic balloon pump may be used to provide support to the heart after a period of delay. In some implementations, a combination of devices is used. For example, a TV-pump may be used to unload the left ventricle while also using an extracorporeal membrane oxygenation (ECMO) pump, or intra-aortic balloon pump, or other mechanical circulatory support system in combination. In some implementations, the reperfusion therapy in the method of the present disclosure comprises at least one of primary percutaneous coronary intervention (PCI) and fibrinolysis.

In some implementations, methods comprise one or more of the following steps: (i) reducing levels of BAX protein and active Caspase-3 antibody in patient cardiac tissue near a myocardial infarction: (ii) increasing levels of BCL-2 and BCL-XL proteins in patient cardiac tissue near a myocardial infarction: (iii) increasing stromal derived factor 1α (SDF-1α) protein levels in patient cardiac tissue near a myocardial infarction: (iv) maintaining activity levels of MMP-2 and MMP-9 enzymes in patient cardiac tissue near a myocardial infarction: (v) limiting upregulation of DPP-4 protein expression and activity in patient cardiac tissue near a myocardial infarction: (vi) reducing circulating levels of brain natriuretic peptide (BNP) in the patient's blood: (vii) increasing mRNA levels of SERCA expression in patient cardiac cells near a myocardial infarction; and (viii) reducing levels of calcineurin activity and Type I collagen in patient cardiac tissue near a myocardial infarction while maintaining levels of b-MHC in the non-infarct region of the patient's heart. The methods may be applied so that any combination (or all) of the foregoing steps are performed. Implementation of one or more of steps (i)-(viii) in any of the methods of the aforementioned embodiments has the surprising result of preventing or limiting the effects of heart failure in a human patient. This can be done by, for example, reducing maladaptive cardiac remodeling in the patient.

In some implementations, the methods may be applied to reduce infarct size in patients having elevated ESTE levels. For example, the method may be applied by unloading the left ventricle of a patient having an MI and an ESTE level of at least 4 (e.g., 5 or 6 or greater than 6), and reducing the infarct size in that patient. In certain implementations, the methods may be applied to reduce the infarct size and the left ventricle scar size. In some implementations, the method also comprises increasing blood flow from the left ventricle of the patient's heart by applying mechanical circulatory support to the patient. In certain implementations, the increased blood flow is provided at a rate of at least 2.5 L/min of blood flow for an unloading period of longer than 15 minutes. In certain implementations, the method also comprises the step of applying reperfusion therapy to the patient cardiac tissue near the myocardial infarction after applying mechanical circulatory support. In further implementations, the system comprises one or more of the following devices that are operated after or during operation of the mechanical circulatory support device: an intra-aortic balloon pump, and an extracorporeal membrane oxygenation (ECMO) pump.

In some implementations, reducing the infarct size is done by reducing myocardial oxygen demand of the heart in the portion of the heart containing the infarction, followed by restoring oxygen supply to the portion of the heart containing the infarction. In certain implementations, the method comprises reducing levels of at least one of BAX protein and active Caspase-3 in cardiac tissue. In other implementations, the method comprises increasing levels of at least one of BCL-2 and BCL-XL. In further implementations, the method comprises increasing a myocardial salvage index (MSI) of the heart.

In certain implementations, the method also comprises the steps of (i) inserting a blood pump into the patient's vasculature, (ii) prior to applying reperfusion therapy to the heart, actuating the pump during a support period to adjust blood flow within the vasculature, and (iii) after the support period, applying reperfusion therapy to the heart. In some implementations, the support period is at least 15 minutes. In other implementations, the support period is at least 30 minutes, between about 20 minutes and about 40 minutes, or at least 45 minutes.

In further implementations, the method also comprises the step of unloading the heart's left ventricle at a pumping rate of at least 2.5 L/minute during the support period. In some implementations, the blood pump is a micro axial blood pump, and unloading the left ventricle of the heart comprises inserting a distal end of the pump into the left ventricle and a proximal end of the pump in the aorta, and actuating the pump to pump blood from the left ventricle into the aorta. In certain implementations, the method comprises the steps of (i) inserting a balloon pump into the aorta of the heart, and (ii) inflating and deflating the balloon to adjust blood flow within the aorta. In other implementations, the pump is a catheter-based intravascular blood pump.

In some implementations, the method comprises at least one of (i) increasing the left ventricular ejection fraction of the heart, (ii) decreasing microvascular obstruction in the heart, (iii) reducing the left ventricular end systolic volume of the heart, and (iv) reducing the left ventricular end diastolic volume of the heart. In other implementations, the method comprises reducing myocardial oxygen demand of the heart in the portion of the heart containing the infarction for a period of at least 15 minutes, followed by restoring oxygen supply to the portion of the heart containing the infarction. In certain implementations, the heart is unloaded by the mechanical circulatory support device concurrently with performing reperfusion therapy on the heart. In some implementations, reperfusion therapy comprises at least one of primary percutaneous coronary intervention (PCI) and fibrinolysis.

In further implementations, the method also comprises the steps of (i) reducing circulating levels of brain natriuretic peptide (BNP) in the patient's blood, (ii) increasing mRNA levels of SERCA expression in patient cardiac cells near the myocardial infarction, and (iii) reducing levels of calcineurin activity and Type I collagen in patient cardiac tissue near the myocardial infarction while maintaining levels of b-MHC in the non-infarct region of the patient's heart. In some implementations, the method also comprises removing the blood pump from the patient's heart after applying the reperfusion therapy. In other implementations, the method also comprises increasing blood flow to patient cardiac tissue near the myocardial infarction.

In some implementations, the methods according to any of the foregoing embodiments may comprise continuing the operation of the pump in parallel with the application of coronary reperfusion. In certain implementations, the pump is operated in parallel with the application of coronary reperfusion for a total support period of at least 3 hours. In other implementations, the methods may comprise operating the pump so as to sufficiently unload the heart to change genetic expression in cells within the myocardial infarct zone. Unloading the heart is such a manner has the advantage of preventing or limiting the effects of heart failure in a human patient. This can be done by, for example, reducing maladaptive cardiac remodeling in the patient. In further implementations, the methods may comprise providing the patient with drug therapy in combination with operating the pump. In certain implementations, the drug therapy may comprise providing the patient with medicament comprising at least one of: beta blockers, afterload reduction agents, neurohormonal agents, and ace inhibitors.

Further advantageous implementations of the present disclosure are provided in the examples and claim embodiments listed below.

Variations and modifications will occur to those of skill in the art after reviewing this disclosure. The disclosed features may be implemented, in any combination and subcombination (including multiple dependent combinations and subcombinations), with one or more other features described herein. The various features described or illustrated, including any components thereof, may be combined or integrated in other systems. Moreover, certain features may be omitted or not implemented.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which:

FIGS. 8A and 8B show results of a second study conducted according to the method of FIG. 2, showing Western blots and quantification graphs for left ventricular (LV) protein levels of stromal-derived factor-1α (SDF1α) and CXCR4 normalized to glyceraldehyde-3-phosphate dehydrogenase (GAPDH) for sham controls and each of the groups having acute myocardial infarction with quantification (group 1: reperfusion alone: group 2: LV unloading for 15 min before reperfusion: group 3: LV unloading for 30 min before reperfusion; and group 4: LV unloading 30 min after reperfusion: n=4 per group):

DETAILED DESCRIPTION

To provide an overall understanding of the systems and methods, certain illustrative implementations will be described. Although the implementations and features described herein are specifically described for use in connection with a circulatory and reperfusion therapy system, it will be understood that the components and other features outlined below may be combined with one another in any suitable manner and may be adapted and applied to other types of circulatory therapy and reperfusion therapy devices. Furthermore, it should be noted that while certain implementations are discussed herein with regards to specific devices for circulatory and reperfusion therapy, these various implementations may be used in various combinations to increase both the efficacy of treatment and sustain patient life after AMI.

Figure 1:
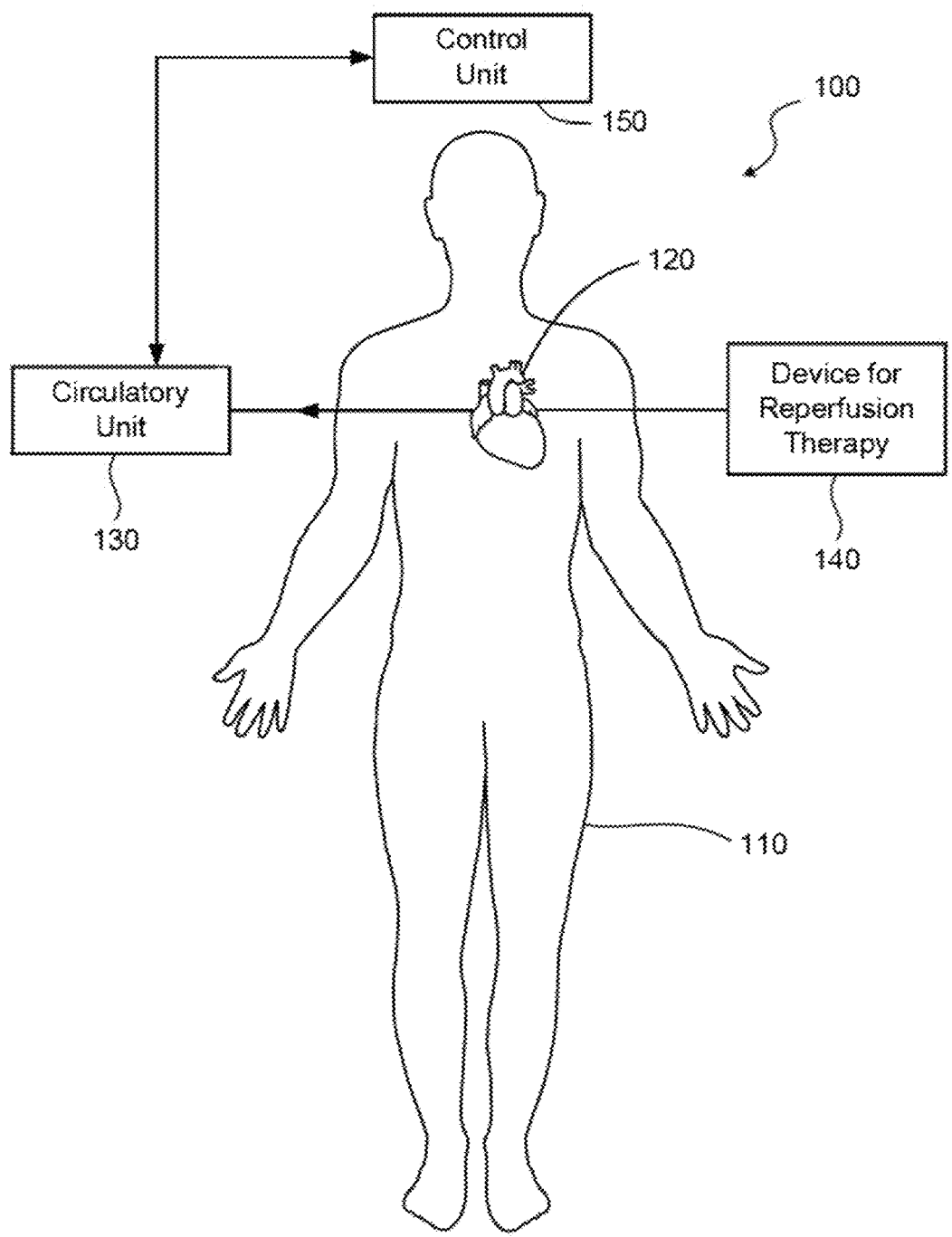
FIG. 1 shows an illustrative cardioprotective system according to an implementation of the present disclosure.

FIG. 1 illustrates a system 100 for providing a combination of mechanical support and Primary Reperfusion according to an implementation of the present disclosure. System 100 aims to limit myocardial damage in a human patient 110 who has experienced AMI in the heart 120. The system 100 comprises a circulatory unit 130 and a device (or other source) for providing reperfusion therapy 140. The circulatory unit 130 is in communication with a control unit 150.

Control unit 150 may monitor signals issued by the circulatory unit 130 and, accordingly, control the operation of the devices (or other source) comprising the circulatory unit 130. These signals may be indicative of any one of the following: the operational state of the circulatory unit 130, the position and state of the device for reperfusion therapy 140, and the state of the patient's heart. Samples from the AMI patient, e.g. blood or cardiac tissue, may be obtained from either the circulatory unit 130 or the device for reperfusion therapy 140, or from a biopsy or other source, for characterization and further testing. This may be done via a testing kit or a laboratory to extract various indicia from these samples so that they can be monitored by a clinician. Such indicia may include, for example, the myocardial infarction scar size, and associated parameters that will be detailed in the following sections.

The circulatory unit 130 comprises a mechanical circulatory support device that can be inserted, for example, in the left ventricle of the patient's heart. Such a mechanical circulatory support device is capable of changing the blood flow above and beyond the actual cardiac output of the heart. For example, the mechanical circulatory support device may be inserted into the left ventricle of the heart of a patient with AMI and actuated to unload the heart by pumping blood out of the ventricle. This can assist the heart in several possible ways. For example, the myocardium wall stress is reduced. This is beneficial as the mechanism of unloading may assist in myocardial salvage and repair. According to an implementation of the present disclosure, the mechanical circulatory support device may comprise a transvalvular microaxial blood pump. Examples of such blood pumps include, but are not limited to, Impella 2.5™ and Impella CPR by Abiomed, Inc., Danvers, MA. Other types of mechanical circulatory support devices may be used to assist the heart, such as extracorporeal pumps. For example, extracorporeal membrane oxygenation (ECMO) or intraaortic balloon pumps may be used. In some adaptations a transvalvular pump is used in combination with another such device.

In addition to the mechanical circulatory support device, the circulatory unit 130 may also comprise additional pump devices that assist with the unloading of the heart. Examples of such pump assist devices include, but are not limited to, any one of the following: an intra-aortic balloon pump, and an extracorporeal membrane oxygenation (ECMO) pump. For example, a transvalvular pump may unload the heart while a balloon pump or ECMO device is applied to further assist the patient. Additionally, the circulatory device may comprise a cannula portion in fluid communication with a pump in which the distal end of the cannula may be positioned within the heart of the patient, and the pump may be positioned at any one of: (a) within the heart with the cannula, (b) outside the heart but within the patient, and (c) outside the patient.

In an implementation of the present disclosure, the device 140 is used to administer reperfusion therapy to the patient undergoing AMI. Such reperfusion therapy includes, for example, primary percutaneous coronary intervention (PCI). These procedures may involve the use of a coronary stent delivered into the distal left anterior descending artery (LAD). Examples of such coronary stents include, but are not limited to, the Promus PREMIER™ and the REBEL™ bare-metal Platinum Chromium Coronary Stents, and the SYNERGY™ Bioabsorbable Polymer Stent, all by Boston Scientific, Marlborough, MA. In certain embodiments, reperfusion therapy 140 may comprise drug or medicament that is capable of assisting in fibrinolysis, thereby providing reperfusion therapy either in combination with or as an alternative to a stent or other device.

A kit or laboratory is capable of generating the following clinical indicia relevant to myocardial infarction: BAX, BCL-2, BCL-XL, DPP-4 and stromal derived factor 1α (SDF-1α) protein levels, active Caspase-3 antibody levels, MMP-2 and MMP-9 enzyme levels in patient cardiac tissue near or in the zone of the myocardial infarction site: mRNA levels of SERCA expression in patient cardiac cells near or in the zone of the myocardial infarction: calcineurin activity levels and Type I collagen levels near or in the zone of the myocardial infarction: brain natriuretic peptide (BNP) levels in blood taken from the left ventricle of the patient's heart: myocardial salvage index; and ST elevation sum(s) from an electrocardiogramap.

Figure 2:
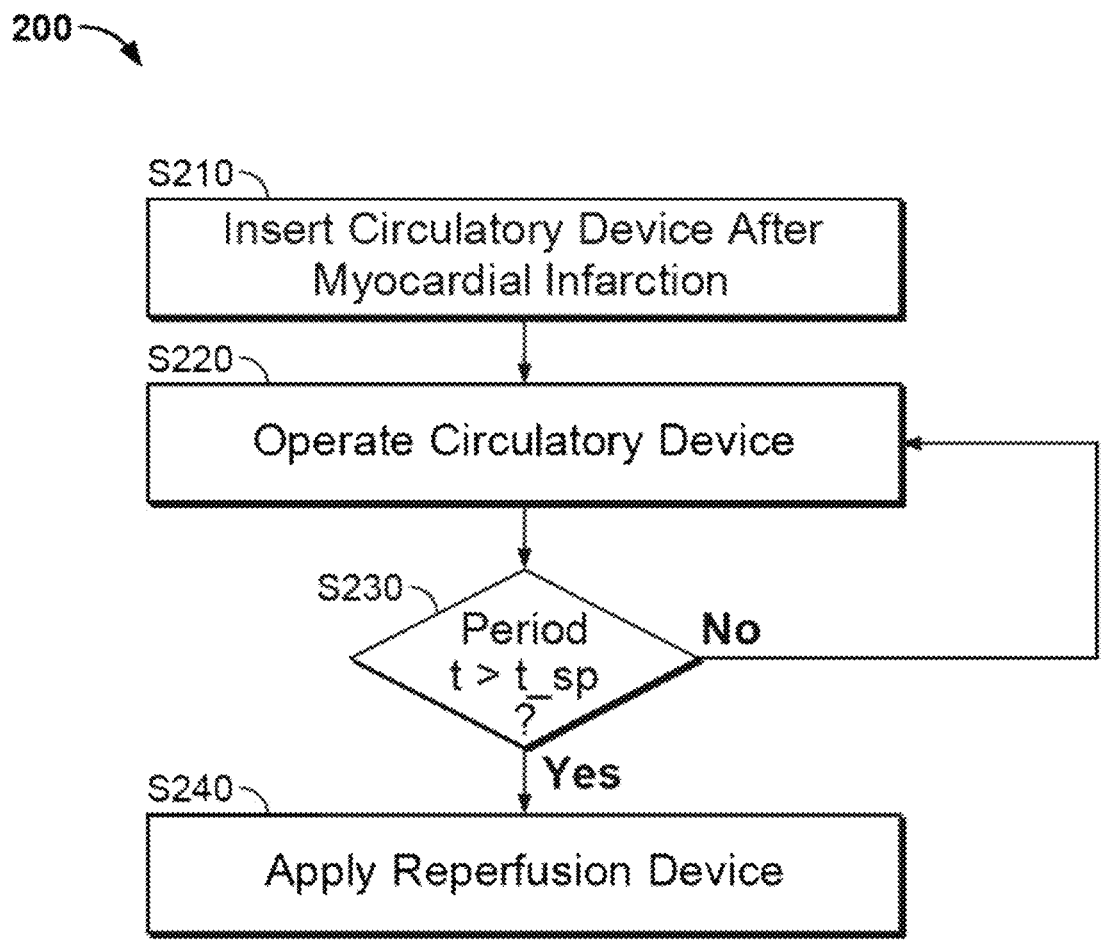
FIG. 2 shows an illustrative method of supporting a patient's heart that has sustained myocardial infarction.

FIG. 2 shows a flowchart of an illustrative method 200 for unloading the left ventricle of the heart in a patient with AMI. The method starts at step S210 where a circulatory device, such as the mechanical circulatory device of the circulatory unit 130 in FIG. 1, is inserted into the patient after myocardial infarction. Such insertion may be achieved by using a vascular access sheath deployed into the right internal jugular vein, left carotid artery, and one or more offemoral arteries and veins of the patient. Further clinical details of such insertion procedures, and associated exemplary supportive data for method 200, are detailed in Examples 1 and 2 in the following sections.

The method 200 then continues to step S220 where the circulatory device is operated in step S230 to support the heart, for example by unloading the patient's heart after myocardial infarction. Here the circulatory device is operated to achieve a pumping rate of at least 2.5 L/min of blood flow from the left ventricle of the heart. In certain implementations, the circulatory device is operated to achieve a blood flow rate from the left ventricle of the heart of at least 3.5 L/min of blood flow per cardiac output. The unloading is performed for a period (the support period t_sp) that is sufficiently long so as to facilitate a reduction in infarct size. In some implementations, operation of the circulatory device is terminated after the support period t_sp has elapsed. In other implementations, the support period is merely used as a marker to indicate the elapse of time t_sp since the circulatory device has commenced operation, and operation of the circulatory device need not be stopped after t_sp has elapsed. Example 1, as detailed in the following sections, provides supportive data for the step of unloading a patient's heart after myocardial infarction using the method 200 of the present disclosure. According to some implementations, the support period t_sp is longer than 15 mins. In other implementations, the support period t_sp is longer than 30 mins.

After the heart has been unloaded in step S230 for the support period, the method progresses to step S240 in which a reperfusion therapy is applied to the patient's heart. Reperfusion therapy is administered using a reperfusion device, drug, or other technique, FIG. 1 applies a reperfusion device 140. Clinical details of such reperfusion therapy procedures, and associated exemplary supportive data for method 200, are provided in Examples 1 and 2 below: According to an implementation of the present disclosure, reperfusion therapy may be applied to the patient's heart after unloading the left ventricle of the heart. In other implementations, reperfusion therapy may be applied to a patient's heart while the left ventricle is still being unloaded by the circulator unit. In this implementation, the parallel use of the reperfusion device and the circulatory device is only carried out after the heart is unloaded with the circulatory device for the length of the support period t_sp.

It is presently believed that supporting the heart after MI with mechanical circulatory support prior to apply reperfusion therapy will have a beneficial effect on the patient's heart. One or more benefits may be detected in tissue or blood samples taken from the patient. Such benefits may include one or more of the following results: reducing levels of BAX protein and active Caspase-3 antibody in patient cardiac tissue near the myocardial infarction: increasing levels of BCL-2 and BCL-XL proteins in patient cardiac tissue near the myocardial infarction: increasing stromal derived factor 1α (SDF-1α) protein levels in patient cardiac tissue near the myocardial infarction: maintaining activity levels of MMP-2 and MMP-9 enzymes in patient cardiac tissue near the myocardial infarction: limiting upregulation of DPP-4 protein expression and activity in patient cardiac tissue near the myocardial infarction: reducing circulating levels of brain natriuretic peptide (BNP) in blood taken from the left ventricle of the patient's heart: increasing mRNA levels of SERCA expression in patient cardiac cells near the myocardial infarction: reducing levels of calcineurin activity and Type I collagen in patient cardiac tissue near the myocardial infarction while maintaining levels of b-MHC in the non-infarct region of the patient's heart: reducing the size of the infarct: increasing the myocardial salvage index of the heart; and exhibiting a heart ST elevation sum in excess of six. These results can be achieved using the systems and methods identified in the present disclosure.

Examples 1 and 2 detailed below illustrate the results of studies performed by applying an inventive method to patients who had suffered a heart attack. The studies were conducted by inserting a blood pump into the patient's vasculature after the patient suffered AMI, but prior to applying reperfusion therapy to the heart, actuating the pump during a support period to adjust blood flow within the vasculature, and then after the support period, applying reperfusion therapy to the heart. The results indicate that infarct size was reduced and myocardial salvage index was increased as compared to conventional methods that apply reperfusion therapy immediately (or as soon as possible) after infarction. Additional results indicate that the method increases the left ventricular ejection fraction of the heart, decreases microvascular obstruction in the heart, reduces the left ventricular end systolic volume of the heart, and reduces the left ventricular end diastolic volume of the heart.

Example 1: DTU-STEMI Pilot Study

The safety and feasibility of activating an unloading device was studied, with or without a delay to coronary reperfusion, to begin exploring whether in the setting of unloading, delaying reperfusion improves myocardial salvage in a human patient. The Door-To-Unload in STEMI Pilot Trial is the first exploratory study testing the feasibility and safety of left ventricle (LV) unloading before reperfusion in STEMI without cardiogenic shock.

A. Method

Figure 3:
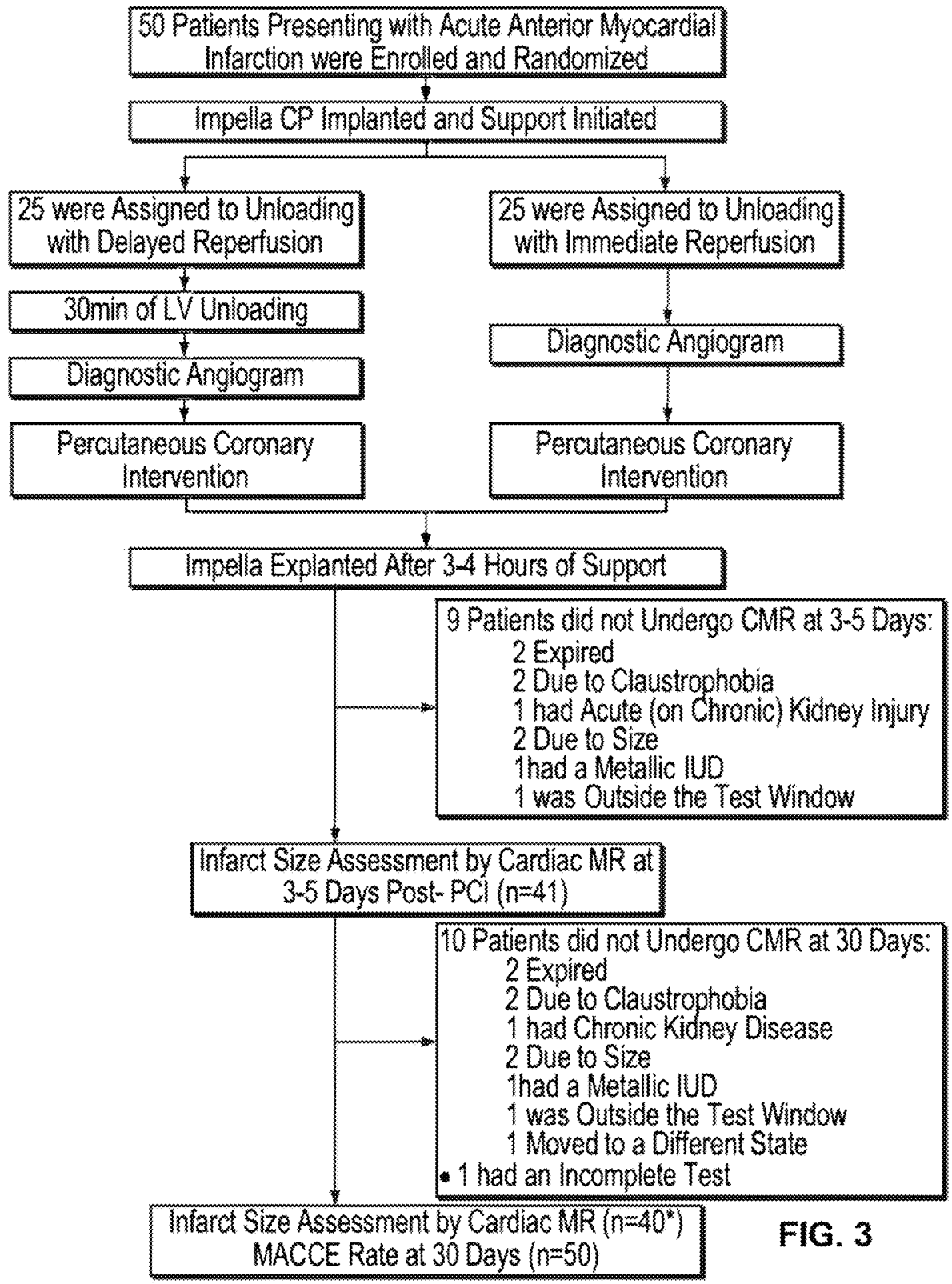
FIG. 3 shows a flow chart outlining the methodology of the study in Example 1 using the method of FIG. 2.

The DTU-STEMI study was a prospective, multicenter, randomized pilot trial involving 14 centers in the United States to explore the feasibility, safety and potential benefit of mechanical unloading prior to coronary reperfusion in patients presenting with anterior STEMI. All patients received acute mechanical unloading with the Impella CP system (Abiomed Inc., Danvers, MA) and were then randomized to one of two arms: LV unloading followed by immediate reperfusion (U-IR) or LV unloading with a 30-minute delay to reperfusion (U-DR). The process flow for U-IR and U-DR methodologies is shown in FIG. 3. This comparison was specifically designed to precondition the myocardium for 30 minutes before reperfusion by comparing infarct sizes in the U-DR versus U-IR arms. Patients 21-80 years of age presenting between 1 to 6 hours from chest pain onset and with ST-segment elevation of ≥2 mm in two or more contiguous anterior leads or ≥4 mm total ST-segment deviation sum in the anterior leads were eligible for enrollment.

Patients were randomized to either U-IR or U-DR arms immediately after femoral vascular access was obtained. The Impella CP was placed prior to diagnostic coronary angiography and operators were instructed to perform percutaneous coronary intervention (PCI) using second-generation drug eluting stents and to follow guideline-directed post-AMI care. In the U-DR group, operators were allowed to shorten the time between unloading and reperfusion if deemed clinically necessary. After PCI, the Impella CP was explanted after a minimum of 3 hours of LV support.

The primary safety outcome was a composite of major adverse cardiovascular and cerebrovascular events (MACCE) including cardiovascular mortality, reinfarction, stroke, or major vascular events at 30 days. Table 1 contains definitions used to adjudicate each component of MACCE. Additional safety parameters included all-cause mortality, hemolysis, acute renal dysfunction, hospitalization for heart failure, ventricular arrhythmias, LV thrombus, bleeding and minor vascular events. The primary efficacy endpoint was an assessment of infarct size as percent of total LV mass at 30 days using CMR. Secondary efficacy endpoints included infarct size by CMR at 3-5 days and 30 days. Exploratory endpoints included a comparison of infarct size normalized to area at risk at 3-5 days between groups. CMR protocols used in the study have been previously described. Qualifying 12-lead electrocardiograms were evaluated to quantify ST Segment Elevation Sum (OSTE), a well-established clinical marker of area at risk in STEMI. Specifically, STE was quantified by measuring the magnitude of ST-segment elevation 0.08 seconds after the J-point across precordial leads as compared to the isoelectric segment in an independent core lab, blinded to the study group allocation.

TABLE 1

| Baseline Characteristics | U-DR (n = 25) | U-IR (n = 25) |
|---|---|---|
| Age, mean (stdev), y | 60.6 (10.7) | 58.8 (11.4) |
| Male sex No. (%) | 21 (84.0) | 17 (68.0) |
| Race, No. (%) | | |
| American Indian/Alaskan Native | 1 (4.0) | 0 (0.0) |
| Asian | 2 (8.0) | 5 (20.0) |
| Black or African American | 4 (16.0) | 4 (16.0) |
| White or Caucasian | 18 (72.0) | 16 (64.0) |
| Other | 0 (0.0) | 0 (0.0) |
| BMI, mean (stdev), kg/m$^2$ | 30.0 (6.0) | 29.6 (9.8) |
| Height, mean (stdev), cm | 175.4 (8.5) | 169.8 (15.3) |
| Weight, mean (stdev), kg | 92.8 (21.1) | 83.7 (19.6) |
| Medical history, No. (%) | | |
| Hypertension (receiving drug therapy) | 14 (56.0) | 12 (48.0) |
| Stroke | 0 (0.0) | 1 (4.0) |
| Transient ischemic attack | 1 (4.0) | 1 (4.0) |
| Current nicotine use | 8 (32.0) | 5 (20.0) |
| Dyslipidemia (receiving drug therapy) | 9 (36.0) | 14 (56.0) |

TABLE 1-continued

Baseline Characteristics

|  | U-DR (n = 25) | U-IR (n = 25) |
|---|---|---|
| Renal insufficiency | 0 (0.0) | 0 (0.0) |
| Diabetes mellitus | 6 (24.0) | 4 (28.6) |
| Prior peripheral arterial disease | 0 (0.0) | 0 (0.0) |
| At presentation | | |
| Blood pressure, mean (stdev), mmHg | mmHg | |
| Systolic | 149 (34) | 157 (26) |
| Diastolic | 88 (15) | 95 (19) |
| MAP | 108 (20) | 116 (20) |
| Heart rate, mean (stdev), beats/min | 89 (22) | 87 (16) |
| Pre-Impella LVEDP | n = 22 | n = 23 |
| LVEDP, mean (stdev), mmHg | 25.0 (9.6) | 24.0 (8.1) |
| Heart rate, mean (stdev), bpm | 87.9 (19.6) | 76.5 (13.6) |
| Anterior ST Elevation Sum, n (%), mm | n = 25 | n = 25 |
| 0-<2 | 0 (0.0) | 2 (8.0) |
| 2-<4 | 1 (4.0) | 2 (8.0) |
| 4-<6 | 3 (12.0) | 2 (8.00) |
| >6 | 21 (84.0) | 19 (76.0) |
| Baseline LVEF | n = 22 | n = 23 |
| LVEF, mean (stdev) | 32.7 (12.7) | 41.9 (12.3) |

Baseline demographic and clinical variables were summarized for the two treatment groups. The study was powered to detect a large difference in infarct size assuming a large standard deviation that may be expected in a small STEMI study. Specifically, a power of 0.88 and an alpha of 0.05 was used to detect an absolute difference in infarct size of 10% with an assumed standard deviation of 10%. All continuous variables were summarized as means with standard deviations as well as medians and interquartile ranges and compared between treatment groups using the appropriate parametric or non-parametric tests. Categorical variables were summarized as frequencies and percentages and compared between treatment groups using Pearson's $\chi 2$ test for contingency tables or Fisher Exact test, as appropriate. All statistical tests and/or confidence intervals, as appropriate, were performed at $\alpha=0.05$ (2-sided). All p-values reported larger than 0.01 are rounded to two decimal places, and those between 0.01 and 0.001 were rounded to three decimal places. The comparability among treatment groups was evaluated with respect to all clinically relevant demographic and baseline characteristic variables.

B. Results

A total of 50 patients with anterior STEMI were enrolled and randomized to either the U-IR or U-DR arms (n=25/group) between April 2017 and May 2018. Baseline characteristics were not statistically different between the groups, as shown in Table 1. Mean age of trial participants was 59.7 years and 38 patients (76%) were male. Patients were hypertensive on presentation with time from chest pain onset to LV Unloading not statistically different between the groups (176.2±73.4 minutes vs 200.2±151.8 minutes, U-DR vs U-IR, p=0.48). ΣSTE was >4 in 90% (n=45/50) of patients. Prior to Impella CP placement, LV end-diastolic pressure was elevated in both groups (25.0±9.6 and 24.0±8.1 mmHg, U-DR vs U-IR, p=0.73). Baseline LVEF was obtained using left ventriculography prior to randomization in 90% (n=45/50) patients using the required PCI arterial vascular access (either femoral or radial per the discretion of the operator). Baseline LVEF was 37.4% (13.2) in the total population and lower in the U-DR group (41.9% (12.3) vs 32.7% (12.7), U-IR vs U-DR, p=0.02). The Impella CP was successfully implanted in all 50 patients with a mean power (P-level) of 7.6=1.0 and mean device flow of 2.8±0.4 L/min during the 3 hours of support required by the study protocol, indicating successful unloading of the LV. Mean time from the start of the procedure to Impella CP implantation and activation was 15.4 (8.4) minutes for the total population. All timing elements are shown in Table 2. Radial artery access was used for PCI in 60% (n=30/50) of patients. The use of a vascular closure device was at the discretion of the operators. In 29/50 of the patients a femoral artery closure device was used (14/25, 56% vs 15/25, 60% U-DR vs U-IR, p=0.99). The left anterior descending artery was identified as the culprit coronary artery and treated with stenting in 98% (n=49/50) of patients, as shown in Table 2. One patient randomized to the U-DR arm did not have any coronary lesions requiring PCI. All patients undergoing PCI received a P2Y12 inhibitor prior to PCI. 8% of patients received bivalirudin and 94% received unfractionated heparin. Among these, one patient received both bivalirudin and unfractionated heparin. 8% of patients received a glycoprotein 2b/3a receptor inhibitor in addition to dual antiplatelet therapy prior to PCI. Coronary angiography was performed after LV unloading was initiated.

TABLE 2

Timing Elements

|  | All Patients | U-DR | U-IR | Value |
|---|---|---|---|---|
| Total Door to Balloon | | | | |
| DTB, mean (stdev), minutes | 84.4 (27.6) | 96.7 (26.1) | 72.6 (24.0) | 0.002 |
| DTB, median (IQR), minutes | 82.0 (62.0-104.0) | 98.0 (76.0-112.5) | 68.0 (55.0-87.0) | |
| Symptom to Unload | n = 50[T] | n = 25[T] | n = 25[T] | |
| Symptom to Unload, mean | 188.2 (118.6) | 176.2 (73.4) | 200.2 (151.8) | 0.48 |
| Symptom to Unload, median (IQR), minutes | 169.5 (121.0-222.5) | 153.0 (119.0-196.0) | 174.0 (124.0-223.0) | |
| Arrival to Lab to Impella Insertion | n = 50 | n = 25 | n = 25 | |
| Insertion Time, mean (stdev), | 15.4 (8.4) | 15.1 (7.9) | 15.8 (9.0) | 0.78 |
| Insertion Time, median (IQR), minutes | 15.0 (12.0-20.0) | 15.0 (8.0-20.0) | 15.0 (12.0-20.0) | |
| Unload to Coronary Balloon | n = 49[Y] | n = 24[Y] | n = 25 | |
| Unload to Balloon, mean (stdev), | 22.1 (12.9) | 34.08 (2.6) | 10.5 (6.7) | <0.001 |
| Unload to Balloon, median (IQR), minutes | 30.0 (10.0-34.0) | 34.0 (32.0035.3) | 10.0 (5.0-12.0) | |
| Duration of Support | n = 50 | n = 25 | n = 25 | |
| Duration of Support, mean | 6.7 (6.4) | 8.2 (7.9) | 5.2 (3.9) | 0.10 |
| Duration of Support, median | 4.0 (3.4-5.8) | 3.9 (3.4-11.9) | 4.2 (3.4-4.9) | |

[T]Based on source documents;
[Y]One patient in the U-DR arm did not have PCI.

Thrombolysis in Myocardial Infarction (TIMI) 0 to 1 flow was observed in 52% (n=26/50) of patients before PCI. Post-PCI TIMI 3 flow was observed in 100% (n=49/49) of patients undergoing PCI.

Figure 4:
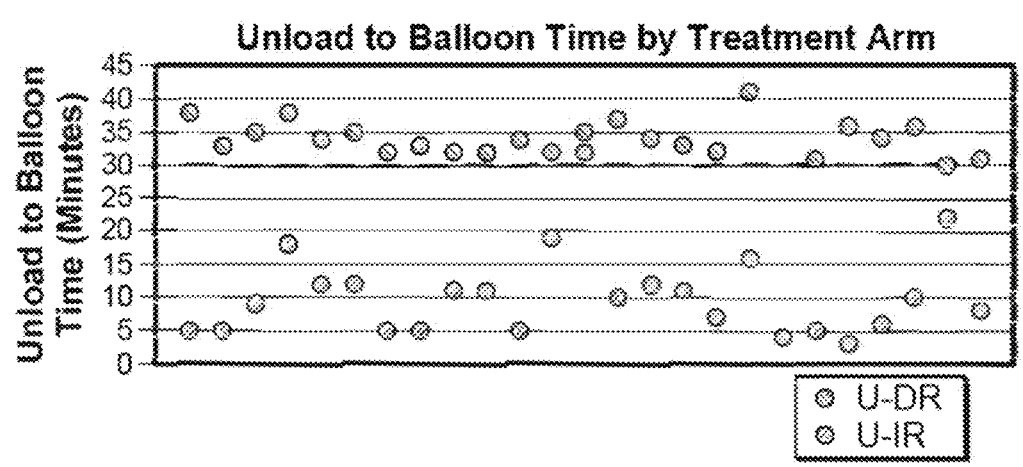
FIG. 4 shows an unload to balloon time scatter plot for the study in Example 1 using the method of FIG. 2.

All patients assigned to the U-DR arm completed 30 minutes of LV Unloading prior to reperfusion without need for bailout PCI in any patient, as shown in FIG. 4. Timing elements including device implantation to balloon reperfusion are shown in Table 2. Mean DTB time was longer in the U-DR arm (96.7±26 vs 72.6±24 mins, U-DR vs U-IR, p=0.002) driven by a prolonged unload to balloon time in the U-DR group (34.1±3 vs 10.5±7 mins, U-DR vs U-IR, p<0.001).

The composite 30-day MACCE events rate for the combined 50 patient cohort was 10% (n=5/50) is shown in Table 3. Extension of the DTB time in the U-DR group did not increase 30-day MACCE (12% [3 events] vs 8% [2 events], U-DR vs U-IR, p=1.00). Overall cardiovascular mortality was 4% (n=2/50) with 1 death per group. No non-cardiovascular mortality was observed. One patient had a stroke one day after enrollment (2%; n=1/50) and two patients had major vascular events (4%; n=2/50) related to flow limiting dissections of the femoral artery at device removal.

TABLE 3

MACCE rate at 30 days

|  | U-DR n = 25 | 95% Cl | U-IR n = 25 | 95% C | P Value |
|---|---|---|---|---|---|
| MACCE No. (%) | 3 (12%) | [2.55%, 31.22%] | 2 (8%) | [0.98%, 26.03%] | 0.99 |
| CV Mortality, No. (%) | 1 (4%) | [0.10%, 20.35%] | 1 (4%) | [0.10%, 20.35%] | 0.99 |
| Reinfarction, No. (%) | 0 (0%) | [0.00%, 13.72%] | 0 (0%) | [0.00%, 13.72%] | — |
| Stroke/TIA, No. (%) | 0 (%) | [0.00%, 13.72%] | 1 (4%) | [0.10%, 20.35%] | 0.99 |
| Major Vascular Events, No. (%) | 2 (8%) | [0.98%, 26.03%] | 0 (0%) | [0.00%, 13.72%] | 0.49 |

Bleeding in Academic Research Consortium (BARC) ☐2 bleeding was observed in 14% (n=7/50) of patients. No BARC 3C (intracranial), 4 (CABG-related) or 5 (fatal) events were observed. Blood transfusions were administered to 6% (n=3/50) of patients with each patient requiring a single unit of packed red blood cells only. Tables 3 and 4 provide details of all additional clinical events.

TABLE 4

Cardiac Magnetic Resonance Studies, all patients

| | 30 days CMR | | | |
|---|---|---|---|---|
| TABLE 4A | All Patients | U-DR | U-IR | P value |
| Infarct Size, No. (%) | 40 (80.0) | 21 (84.0) | 19 (76.0) | 0.53 |
| mean (stdev) % | 14.1 (11.3) | 13.1 (11.3) | 15.3 (11.5) | |
| median (IQR) | 11.1 (5.0-22.8) | 10.4 (5.0-26.1) | 13.0 (3.8-22.9) | |
| LVEF, No. (%) | 40 (80.0) | 21 (84.0) | 19 (76.0) | 0.87 |
| mean (stdev) % | 48.9 (13.0) | 49.2 (12.9) | 48.5 (13.4) | |
| median (IQR) | 47.3 (38.2-60.9) | 47.4 (39.4-61.0) | 47.2 (35.9-59.9) | |
| LVESV, No. (%) | 39 (78.0) | 20 (80.0) | 19 (76.0) | 0.86 |
| mean (stdev) ml | 77.1 (39.1) | 76.0 (43.9) | 78.3 (34.4) | |
| median (IQR) | 65.5 (43.7-105.3) | 69.0 (38.7-100.6) | 65.5 (50.2-106.0) | |
| LVEDV, No, (%) | 39 (78.0) | 20 (80.0) | 19 (76.0) | 0.63 |
| mean (stdev) ml | 144.3 (44.2) | 140.9 (50.8) | 147.9 (37.1) | |
| median (IQR) | 149.6 (106.1-171.0) | 147.8 (97.8-171.6) | 149.6 (119.2-171.0) | |
| | 3-5 days CMR | | | |
| Table 4B. | All Patients | U-DR$^\Delta$ | U-IR | P value |
| Infarct Size, No. (%) | 40 (80.0) | 20 (80.0) | 20 (80.0) | 0.58 |
| mean (stdev) % | 17.9 (13.5) | 16.7(13.3) | 19.1 (14.0) | |
| median (IQR) | 15.3 (6.7-30.1) | 15.2 (6.7-23.9) | 15.3 (7.4-30.5) | |
| Infarct/AAR, No.(%) | 40 (80.0) | 20 (80.0) | 20 (80.0) | 0.28 |
| mean (stdev) % | 47.9 (21.4) | 44.2(18.9) | 51.6 (23.6) | |
| median (IQR) | 50.3 (31.3-66.2) | 47.3 (28.8-59.5) | 57.1 (38.4-71.8) | |
| MVO$^T$, No. (%) | 40 (80.0) | 20 (80.0) | 20 (80.0) | 0.22 |
| mean (stdev) % | 2.0 (3.6) | 1.3 (2.7) | 2.7 (4.4) | |
| median (IQR) | 0.0 (0.0-2.2) | 0.0 (0.0-1.7) | 0.7 (0.0-3.0) | |
| Salvage Index$^Y$, No. | 40 (80.0) | 20 (80.0) | 20 (80.0) | 0.28 |
| mean (stdev) % | 52.1 (21.4) | 55.8 (18.9) | 48.4 (23.6) | |
| median (IQR) | 49.8 (34.0-67.0) | 52.7 (41.3-71.0) | 43.0 (28.2-59.8) | |
| LVEF, No. (%) | 41 (82.0) | 21 (84.0) | 20 (80.0) | 0.69 |
| mean (stdev) % | 45.5 (11.8) | 44.7 (9.2) | 46.2 (14.3) | |
| median (IQR) | 45.0 (37.2-S3.7) | 45.0 (37.9-52.2) | 47.3 (32.6-54.9) | |

TABLE 4-continued

| Cardiac Magnetic Resonance Studies, all patients | | | | |
|---|---|---|---|---|
| LVESV, No. (%) | 40 (80.0) | 20 (80.0) | 20 (80.0) | 0.69 |
| mean (stdev) ml | 80.5 (34.7) | 82.7 (39.4) | 78.3 (30.1) | |
| median (IQR) | 79.6 (58.8-96.8) | 79.6 (60.6-93.8) | 80.8 (57.8-102.9) | |
| LVEDV, No, (%) | 40 (80.0) | 20 (80.0) | 20 (80.0) | .088 |
| mean (stdev) ml | 144.1 (40.3) | 145.1 (47.8) | 143.1 (32.5) | |
| median (IQR) | 143.6 (123.7-167.4) | 143.9 (118.0-167.4) | 143.6 (123.7-167.4) | |

[Δ]A patient in the U-DR arm had a test without contrast, the core laboratory could only read the LVEF
[I]MVO: microvascular obstruction
[I]Myocardial Salvage Index (MSI) = 1 − infarct size/area at risk (AAR)

CMR was performed in 82% (n=41/50) of patients between days 3 to 5 and in 80% (n=40/50) at 30 days of follow up. The primary efficacy endpoint of infarct size normalized to total LV mass at 30 days was 14.1% (n=40/50) for the total group. No difference was observed between groups (13.1±11.3% vs 15.3±11.5%, U-DR vs U-IR, p=0.53). Among the secondary and exploratory endpoints, at 3-5 days, mean infarct size normalized to total LV mass of 17.9±13.5% and Infarct size normalized to the area at risk of 47.9±21.4% were observed for the total group (n=40; Table 4). Infarct size normalized to the area at risk was not statistically different between the groups (44.2±18.9 vs 51.6±23.6, U-DR vs U-IR, p=0.28). Mean microvascular obstruction was 1.3% versus 2.7% for the U-DR and U-IR groups respectively (p=0.22). LV ejection fraction and LV volumes were not statistically different between the groups at 3-5 days and 30 days. TIMI flow did not correlate with infarct size in the U-IR and U-DR groups.

Among patients with CMR data available at 3-5 days, a ΣSTE>4, ΣSTE>5, and ΣSTE>6 was observed in 88% (n=35/40), 83% (n=33/40), and 75% (n=30/40) of patients respectively. Compared to the U-IR group, infarct size normalized to the area at risk was significantly decreased in the U-DR group with a ΣSTE>6 (44.1% vs 59.9%, U-DR vs U-IR, p=0.04, as shown in FIG. 5).

C. Analysis of Results

The DTU-STEMI safety and feasibility pilot study represents the first human experience of mechanically unloading the LV and intentionally delaying coronary reperfusion (Primary Unloading) in anterior STEMI using the method 200 of the present disclosure. These findings suggest for the first time that it is feasible to alter STEMI therapy by first focusing on reducing myocardial oxygen consumption (unloading) and then restoring coronary reperfusion.

Multiple attempts to limit infarct size have been tested, however no prior clinical trial has intentionally extended the delay to reperfusion after initiating a cardioprotective treatment strategy. Given the disruptive concept of first unloading the LV and delaying reperfusion, 30-day MACCE was selected as the primary safety endpoint to provide a rigorous and sensitive analysis of any potential risk associated with the DTU-STEMI strategy. In both the U-IR and U-DR arms, overall MACCE rates were relatively low without any incidence of reinfarction or any prohibitive safety signals. Among the individual MACCE elements, CV mortality was observed in one patient for each arm of the study and approaches national benchmarks for 30-day STEMI mortality rates. One patient was diagnosed with an acute exacerbation of pulmonary fibrosis on post-op day 3 and expired 10 days later from respiratory failure, the second mortality was a patient who presented in cardiogenic shock which was detected only after enrollment. Major vascular event rates in the DTU-STEMI study were comparable to the pump arm of the Intra-aortic Balloon Counterpulsation and Infarct Size in Patients with Acute Anterior Myocardial Infarction Without Shock (CRISP-AMI) study. Overall BARC bleeding >2 in the DTU-STEMI was lower than reported in a recent analysis of bleeding events involving percutaneous ventricular assist devices, and, as expected, higher than those reported in other STEMI trials involving drug therapy or lower French size devices. A key aspect of testing the concept feasibility was gaining a better understanding of the time required to establish LV unloading prior to PCI and its impact on door-to-balloon and overall ischemic time. From the start of the procedure to insertion and activation of the Impella CP required 15.4 minutes on average for the total 50 patient study, as shown in Table 2. This time includes prepping. draping, vascular access, left ventriculography and insertion of the Impella device. This observation highlights key insights gained from this pilot study including: 1) it is feasible to implant and activate this unloading device in a timely manner during an anterior STEMI, 2) despite this inherent delay, operators were able to achieve average door to balloon times of 84.4 (27.6) minutes across all 50 patients, and 3) despite this inherent delay, overall infarct sizes were low relative to recent reports including CRISP-AMI and did not correlate with DTB times. These findings support that the DTU-STEMI strategy may be safely tested in a larger pivotal trial.

By providing 30 minutes of LV unloading before reperfusion, we postulated that a cardioprotective shift in myocardial signaling and coronary perfusion limits myocardial damage. For this reason, patients with a larger area of myocardium at risk may achieve more benefit with a mechanical preconditioning before reperfusion. This is consistent with the observation that patients with higher ΣSTE, a well-established marker of myocardium area at risk in STEMI, demonstrated lower infarct size and a higher index of myocardial salvage with 30 minutes of unloading before reperfusion compared to unloading and immediate reperfusion alone. Multiple studies have confirmed that infarct size and myocardial salvage quantified by single-photon emission computed tomography (SPECT) or CMR correlate directly with clinical outcomes including MACE at 6 months after STEMI. Infarct size normalized to the area at risk in both arms of the DTU-STEMI study is lower than reported values for recent STEMI studies involving IABPs or beta-blocker therapy. The patients in the U-DR group presented with a lower EF and a high rate of ST elevation ≥6, which despite the randomization of patient can be seen given the small number of patients, however this did not translate into did not translate to a larger infarct or lower EF at 30 days. These findings suggest that the DTU-STEMI strategy does not increase infarct size and further that among patients with high ST-elevation, extending the delay to reperfusion may improve myocardial salvage.

The DTU-STEMI pilot study overcomes a critical barrier to progress in the field of cardioprotection and myocardial recovery by suggesting for the first time that it is possible to delay coronary reperfusion, thereby allowing enough time for LV unloading to precondition the myocardium and reduce ischemia-reperfusion injury and overall myocardial damage in AMI.

Example 2

In the setting of myocardial ischemia-reperfusion injury, increased expression of proteases, including matrix metalloprotease (MMP)-2 and MMP-9 and dipeptidyl peptidase-4 (DPP-4), cleave the N-terminus of stromal-derived factor (SDF)-1α, thereby rendering the cytokine inactive. Any remaining SDF-1α can bind to CXCR4, which promotes phosphorylation of the RISK pathway including extracellular regulated kinase (Erk), protein kinase b (Akt), and glycogen synthase kinase 3b (GSK3b). RISK activation promotes cell survival by limiting cardiomyocyte apoptosis and maintains mitochondrial integrity by preventing opening of the mitochondrial trans-permeability pore. The mechanisms underlying the cardioprotective benefit of P-unloading and whether the acute decrease in infarct size results in a durable reduction in left ventricular (LV) scar and improvement in cardiac function are further explained herein. This study tested the importance of delayed myocardial reperfusion, explored cardioprotective mechanisms, and determined the late-term impact on myocardial function associated with P-unloading.

A. Methods

Studies were conducted in adult, male Yorkshire swine. The Institutional Animal Care and Use Committee at Tufts Medical Center approved the study protocol. All experiments were performed according to the committee's guidelines. Animals were premedicated with Telazol (0.8 ml/kg, intramuscular: Zoetis Services LLC, Parsippany, New Jersey). General anesthesia was induced and maintained with isoflurane (1% to 2%). All animals were intubated and mechanically ventilated (Harvard Apparatus, Holliston, Massachusetts) with room air and supplemented oxygen to maintain physiological pH and oxygen saturation. Surface electrocardiogramads, an orogastric tube, peripheral 18 G venous catheters, and a rectal thermistor were placed in all animals. Heating pads were used as needed to maintain a core body temperature >99° F. Vascular access sheaths were then deployed into the right internal jugular vein (10-F), left carotid artery (7-F), and both femoral arteries (7-F) and veins (10-F). Unfractionated heparin boluses with a goal activated clotting time of 300 to 400 s, continuous lidocaine infusion (1 mg/kg), and noradrenaline (0.16 mg/min) were initiated in all animals.

A 6-F Judkins right coronary catheter (Boston Scientific, Marlborough, Massachusetts) engaged the left coronary artery via the right femoral artery, and baseline angiograms were recorded. A 0.014-inch guidewire was delivered into the distal left anterior descending artery (LAD) and a 3.0×8 mm bare-metal stent (Boston Scientific) for acute studies or a 3.0×8 mm angioplasty balloon (Boston Scientific) for chronic studies was deployed in the mid-LAD after the first diagonal branch with angiographic confirmation of LAD occlusion. Coronary angiography also performed immediately after reperfusion and again after the end of the study protocol confirmed patency of the LAD. LAD stents were used in the acute animal study to mark the exact location for repeat balloon occlusion during Evans blue counterstaining. Animals were then euthanized with pentobarbital and phenytoin after 120 min of reperfusion.

Figure 6A:
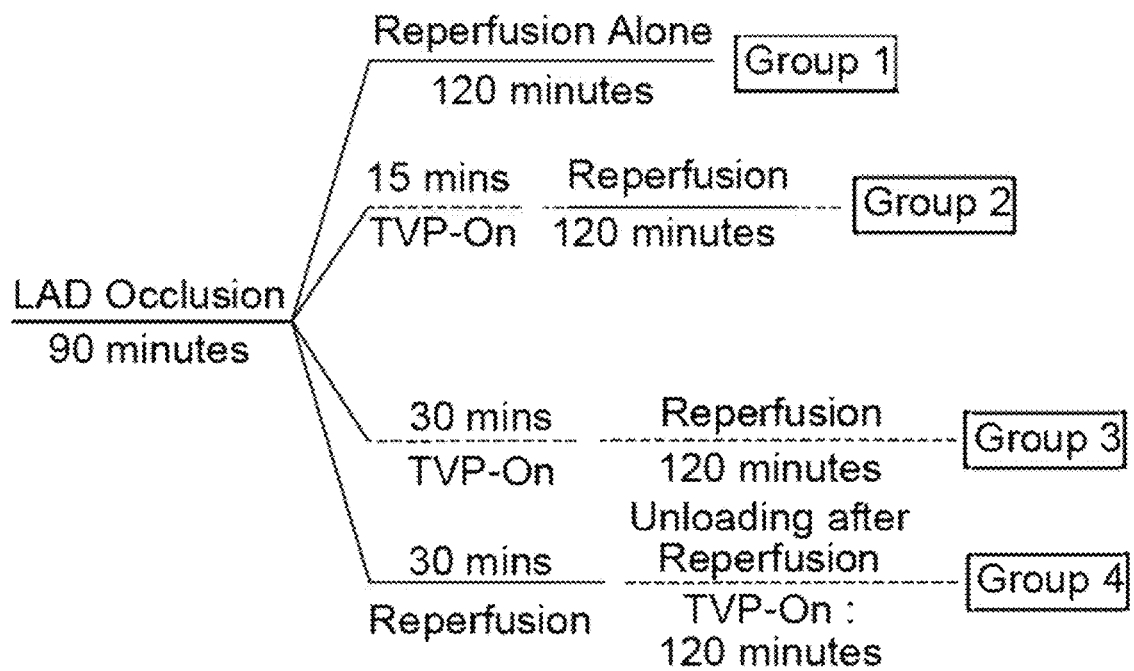
FIG. 6A shows a flowchart illustrating the effect of reperfusion alone (group 1), left ventricular unloading for 15 min (group 2) or 30 min (group 3) before reperfusion, or left ventricular unloading after reperfusion (group 4) in the study of Example 2 using the method of FIG. 2.

The swine were divided into 4 groups (n=4 per group), as shown in FIG. 6A. All groups underwent 90 min of LAD occlusion. In group 1, LAD occlusion followed by 120 min of reperfusion served as the control group. In groups 2 and 3, LAD occlusion was followed by insertion of a TV-pump (Impella CP, Abiomed, Danvers, Massachusetts) via a 14-F sheath in the left femoral artery. The pump was activated and maintained at maximal support (44,000 rotations/min, achieving 3.5 l/min) to provide LV unloading for 15 min (group 2) or 30 min (group 3), respectively, and then 120 min of reperfusion with LV unloading. In group 4, LAD occlusion was followed by reperfusion, and after 30 min of reperfusion, a TV-pump was inserted and activated for the remaining 90 min of reperfusion.

At the end of each study, animals were euthanized for determination of myocardial infarct size. Three sham-operated animals were intubated, anesthetized, and mechanically ventilated without myocardial infarction or mechanical unloading. LV tissue samples obtained from sham controls were used for tissue analysis.

To assess the functional role of SDF-1α/CXCR4 signaling or the cardioprotective effect of LV unloading, an over-the-wire coronary angioplasty balloon was used to deliver a pharmacological inhibitor of the SDF-1α receptor, CXCR4 (known as AMD3100), into the area at risk while maintaining occlusion of the LAD in a closed-chest animal model of AMI. Adult male swine were treated with intracoronary injections of either vehicle or AMD3100 (3 mg/kg/min, intracoronary over 10 min: n=4 per group) initiated at the onset of LV unloading for 30 min before reperfusion. The dose of AMD3100 was chosen based on previous reports (Hu X, Dai S, Wu W J, et al. Stromal cell derived factor-1 alpha confers protection against myocardial ischemia/reperfusion injury: role of the cardiac stromal cell derived factor-1 alpha CXCR4 axis. Circ 2007:116:654-63).

To study the long-term effects of LV unloading on infarct size, 19 adult male Yorkshire swine were subjected to either 90 min of mid-LAD occlusion followed by immediate reperfusion (P-reperfusion) or 30 min of unloading before reperfusion (P-unloading). Five animals died of ventricular arrhythmias during LAD occlusion before randomization or pump implantation. Of the remaining 14 animals that successfully completed the protocol, 2 animals died in the P-reperfusion group within 6 h after reperfusion due to refractory ventricular fibrillation. No animals died in the P-unloading group. In total, 7 (37%) of 19 animals died during the study protocol. The surviving 12 animals were used for analysis in the chronic study, in either the P-reperfusion group (n=6), or the P-unloading group (n=6), as shown in FIG. 6A. Animal weights were 76.7±6.9 kg in the P-unloading group and 76.2±2.4 kg in the P-reperfusion group (p=0.84). After reperfusion, all animals were recovered and monitored for 28 days. After 28 days, animals were re-anesthetized and underwent repeat catheterization to assess infarct size according to cardiac magnetic resonance imaging (MRI) and LV hemodynamics.

Changes in LV pressure and volume were assessed by using a 5-F conductance catheter system (Sigma M, C D Leycom, Hengelo, the Netherlands) deployed via the left carotid into the left ventricle. Ventricular pressure and volume were measured at 28 days after the initial infarct in the chronic-phase study by using a solid-state pressure transducer and dual-field excitation mode, respectively, as previously described. Time-varying electrical conductance has measured across 5 to 7 ventricular blood segments delineated by selected catheter electrodes. Correct positioning of the conductance catheter along the long-axis of the left ventricle was confirmed by fluoroscopy. Parallel conductance was assessed by injecting 20 ml of hypertonic (6%) saline into the right internal jugular vein. Absolute LV volumes were measured by subtracting parallel conductance from total conductance volumes. Stroke volume is calculated as the difference in conductance volumes at +dP/dtmax and −P/dtmin. LV stroke work was calculated as the product of peak LV peak systolic pressure and stroke volume.

A-1. Determination of Myocardial Infarct Size

Upon completion of the acute study protocol, balloon occlusion was performed within the mid-LAD stent and Evans blue injected into both coronary vessels to delineate the area-at-risk followed by removal and sectioning of the left ventricle. Biopsy specimens were obtained from the antero-apical left ventricle distal to the site of stent deployment (infarct zone) and from the postero-basal wall (non-infarct zone) for molecular analysis: LV slices were then incubated in 1% triphenyltetrazolium chloride, as previously described. To quantify LV scar size 28 days after MI, the left ventricle was sectioned into five 1-cm slices and then incubated in triphenyltetrazolium chloride without Evans blue. LV slices were then photographed, and 3 blinded reviewers used digitized planimetry to quantify the total myocardial area, area-at-risk, and infarct zone.

Animals in the chronic-phase study underwent a cardiac MRI with late-gadolinium enhancement (LGE) 28 days after the initial infarct using a Philips Achieva 1.5-T scanner (Philips Healthcare, Best, the Netherlands). Steady-state free precession breathhold cine images were obtained in 3 long-axis planes and sequential short-axis slices from the atrio-ventricular ring to the apex. LV and right ventricular volume, mass, and ejection fraction were measured by using standard volumetric techniques and analyzed with commercially available software (QMASS version 7.4, Medis Medical Imaging Systems, Leiden, the Netherlands) by a blinded observer experienced in cardiac magnetic resonance (CMR) analysis. LGE images were acquired 10 to 15 min after intravenous administration of 0.2 mmol/kg gadolinium-diethylenetriamine penta-acetic acid with breath-hold 2-dimensional, phase-sensitive inversion recovery sequences in identical places as in cine images. LGE regions were defined by using full width at one-half maximum (>50% of maximum myocardial signal intensity) with manual adjustment when needed. Areas with LGE were summed to generate a total volume of LGE and are expressed as a proportion of total LV myocardium (% LGE).

Whole-transcriptome expression analysis was performed on ribonucleic acid (RNA) isolated from the infarct zone after the acute phase protocol using Porcine 1.0 ST microarrays. (The Online Appendix presents details.) All raw and processed data from this microarray analysis can be accessed under the Gene Expression Omnibus accession number GSE108644. Quantitative polymerase chain reaction (PCR) and Western blot analysis confirmed expression of significantly regulated genes and their activation in altered pathways.

LV tissue samples were obtained from the center of the infarct zone, washed and fixed with 3% glutaraldehyde in phosphate buffer, and then embedded in epoxy resin. Electron micrographs were acquired and analyzed for cardiomyocyte injury, including mitochondrial swelling and integrity.

A-2. Quantification of SDF-1α and CXCR4 Levels

Total protein was extracted from tissue homogenates, isolated as previously described (22-24). SDF-1α protein levels were quantified in LV tissue isolated from sham-operated animals and infarct zones using Western blot analysis and an enzyme-linked immunosorbent assay. Circulating serum levels of SDF-1α were quantified by using an enzyme-linked immunosorbent assay (R&D Systems, Minneapolis, Minnesota). CXCR4 levels in LV tissue isolated from sham-operated animals and infarct zones were quantified by Western blot analysis (Abcam, Cambridge, United Kingdom). Immunoblot analysis was then performed as previously described.

A-3. Quantification of MMP-2, MMP-9, and DPP-4 Levels and Activity

MMP-2 and MMP-9 activities in homogenates of heart tissues were determined by zymography as previously described. Briefly, gelatin zymography was performed with sodium dodecyl sulfate polyacrylamide gel electrophoresis gels containing 1 mg/ml of porcine gelatin. Samples were prepared under nonreducing conditions. Gel electrophoresis was performed at 150 V for 1 h. After electrophoresis, the gel was washed in 2.5% Triton X-100 solution with gentle agitation for 6 h at room temperature, followed by replacement with developing buffer containing 50 mM Tris-HCl (pH 7.5), 0.2 M NaCl, 5 mM CaCl2, and 0.2% Brij-35. The gel was agitated at room temperature for 30 min, placed into fresh developing buffer, and incubated at 37° C. overnight. The following morning, gels were stained with 0.5% Coomassie Brilliant Blue R-250) in 40% methanol and 10% acetic acid for 2 to 4 h and destained in 40% methanol and 10% acetic acid at room temperature. Gelatinolytic bands were quantified by scanning densitometry with ImageJ software (National Institutes of Health, Bethesda, Maryland). DPP-4 protein levels were quantified by immunoassay, and activity levels were measured by using a commercially available activity assay kit (MilliporeSigma, Burlington, Massachusetts).

A-4. Quantification of Apoptotic Signaling Pathways

Immunoblot analysis was performed by using antibodies against porcine B-cell lymphoma (BCL)-2 (Cell Signaling Technology, Danvers, Massachusetts), BAX (Cell Signaling Technology), B-cell lymphoma-extra-large (BCL-XL) (Cell Signaling Technology), caspase-3 (Cell Signaling Technology), and glyceraldehyde-3-phosphate dehydrogenase. Expression of apoptosis regulatory protein levels were normalized to both total protein levels and glyceraldehyde-3-phosphate dehydrogenase. TUNEL staining was performed by using 10-mm thick from sections obtained the peri-infarct zone fixed in 4% paraformaldehyde/phosphate-buffered saline for 20 min. Slides were permeabilized on ice with 0.1% Triton X-100 in 0.1% sodium citrate, and sections were labeled in the dark at 37° C. for 60 min. Slides were rinsed with phosphate-buffered saline, and nuclei were labeled with ProLong Gold Antifade with DAPI (Life Technologies, Grand Island, New York). Images were acquired by using an Eclipse E800 fluorescence microscope (Nikon Corporation, Tokyo, Japan) and Openlab version 5 software (Perkin Elmer, Waltham, Massachusetts). TUNEL-positive cells were counted at 10× magnification by an investigator blinded to experimental group and are expressed as a percentage of all nuclei.

A-5. Other

For all cell-based real-time PCR experiments, total RNA was extracted directly with Trizol (Thermo Fisher Scientific, Waltham, Massachusetts) and converted to complementary deoxyribonucleic acid with a High Capacity cDNA Reverse Transcription Kit (Thermo Fisher Scientific). For all real-time PCR experiments, samples were quantified in triplicate by using 40 cycles performed at 94° C. for 30 s, 60° C. for 45 s, and 72° C. for 45 s with an ABI Prism 7900 Sequence Detection System (Thermo Fisher Scientific) using appropriate primers.

Results are presented as mean±SD. An unpaired Student's t-test or one-way analysis of variance was used to compare continuous variables between groups. All data within groups over time were analyzed by using nonparametric 2-way repeated measures analysis of variance. Simple linear regression analysis was used to evaluate for a correlation between two parameters. All statistical analyses were performed with GraphPad Prism (GraphPad Software, La Jolla, California). An alpha-level of p<0.05 was considered to indicate a significant effect or between-group difference.

B. Results

Figure 6B:
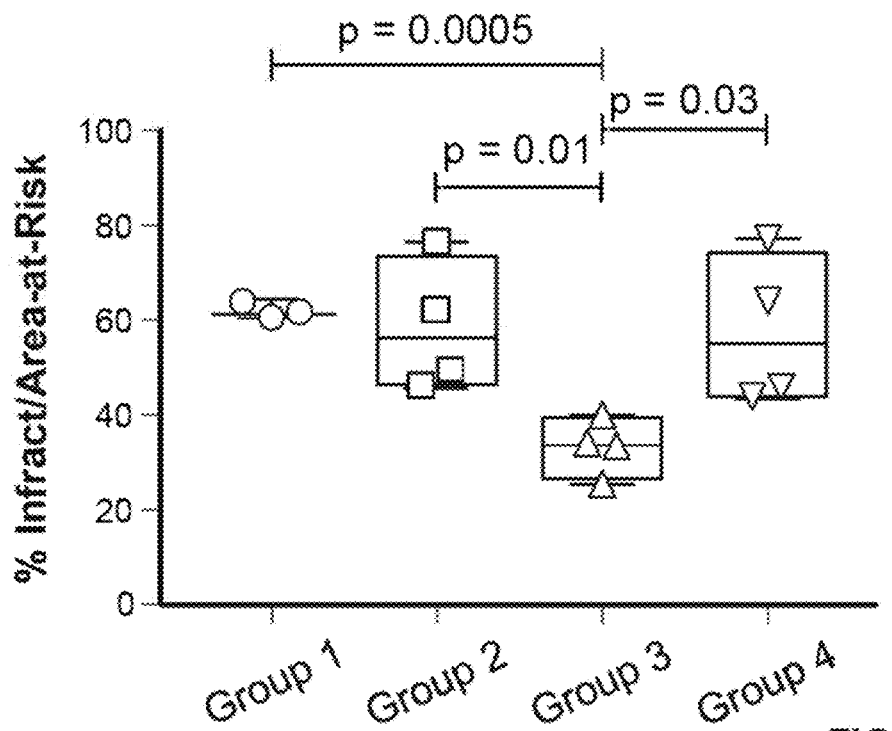
FIG. 6B shows infarct area as a percentage of the area at risk for each group (1-way analysis of variance=0.017 across all 4 groups) according to the study of Example 2.

B-1. LV Unloading for 30 Min Before Reperfusion Reduces Acute Infarct Size Compared with Reperfusion Alone LV unloading for 30 min before reperfusion reduced myocardial infarct size compared with reperfusion alone (33.3±5% vs. 62.2±1.7% infarct/area-at-risk, group 3 vs. group 1, respectively: p<0.01) (see FIG. 6B). LV unloading followed by rapid reperfusion within 15 min (group 2) or after reperfusion (group 4) failed to reduce myocardial infarct size compared to P-reperfusion alone.

Figure 7A:
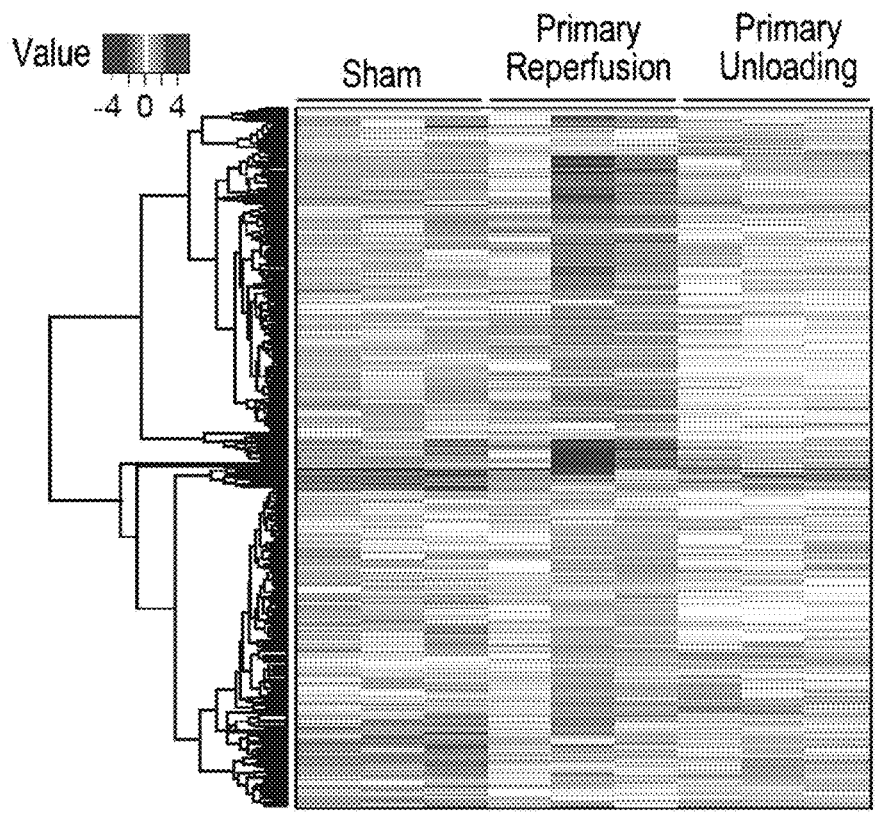
FIG. 7A shows a genomic heat map illustrating the shift in gene expression among sham-operated controls, using reperfusion alone (group 1), and using left ventricular (LV) unloading for 30 min before reperfusion (group 3) (n=3 per group)

B-2. LV Unloading Induces a Global Shift in Gene Expression Associated with Reduced Injury within the Infarct Zone after AMI To begin exploring cardioprotective mechanisms associated with LV unloading before reperfusion, we analyzed whole transcriptomes from within the infarct zone among sham controls, group 1, and group 3 to identify genes that were differentially expressed between treatment groups. A heat map of all differentially regulated genes showed that compared with sham controls, LV unloading for 30 min before reperfusion attenuates changes in the gene expression associated with reperfusion alone (see FIG. 7A).

Figure 7B:
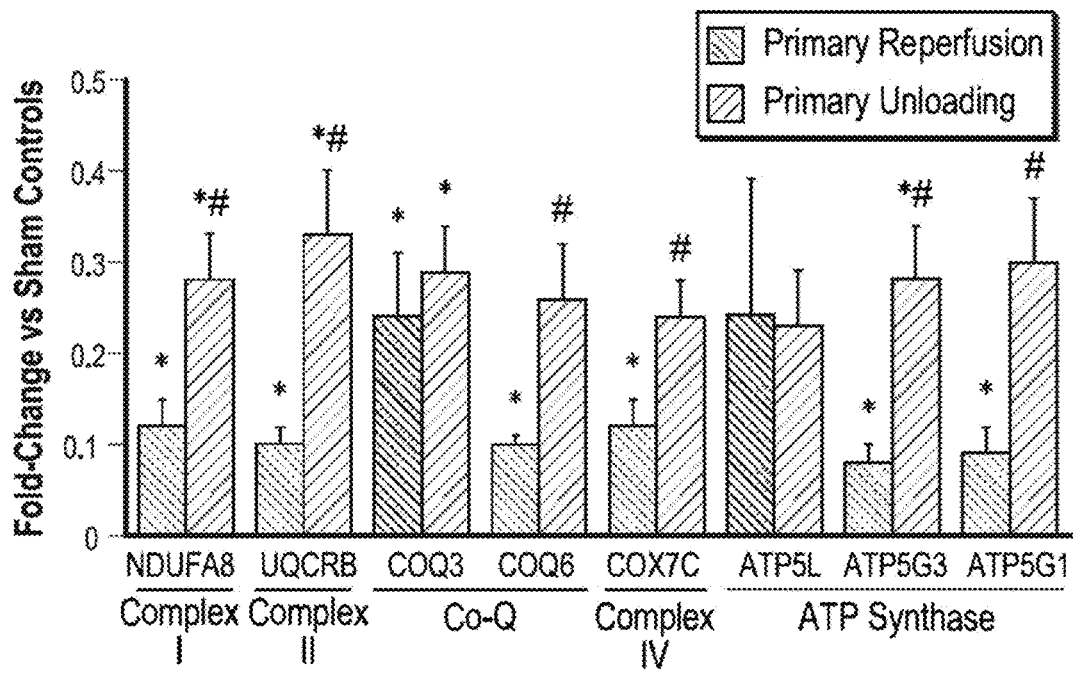
FIG. 7B shows a graph illustrating further results of the study referenced in FIG. 3, showing relative messenger ribonucleic acid levels of representative genes from key components of the electron transport chain from within the infarct zone of group 1 (blue) or group 3 (orange) of FIG. 7A, *p<0.05 versus sham control: #p<0.05 versus primary reperfusion.
Figure 7C:
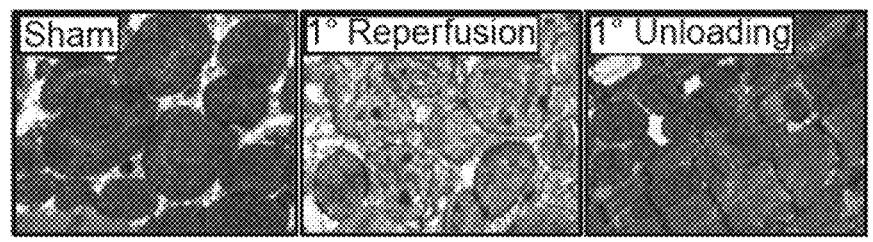
FIG. 7C shows representative transmission electron micrographs of cardiomyocyte mitochondria from sham controls and from within the infarct zone of group 1 and group 3 of FIG. 7A.

Relative to reperfusion alone, LV unloading for 30 min before reperfusion limited down-regulation of genes associated with mitochondrial function and cellular respiration (see Table 5 below). Consistent with these observations, real-time PCR of LV tissue samples from the infarct zone confirmed that compared with group 1, group 3 exhibited increased messenger ribonucleic acid (mRNA) levels of key genes associated with cellular respiration, as shown in FIG. 7B. Electron microscopy further showed loss of mitochondrial integrity within the infarct zone from group 1 (but not group 3), as shown in FIG. 7C. These findings identify that compared with reperfusion alone, LV unloading for 30 min before reperfusion triggers a broad shift in gene expression within the infarct zone, with significant protection of genes associated with mitochondrial function.

B-3. LV Unloading Limits SDF-1α Degradation in AMI

Given the importance of SDF-1α/CXCR4 signaling in cardioprotection during ischemia-reperfusion injury, SDF-1α and CXCR4 protein levels were quantified within the infarct zone. We observed that compared with sham controls, reperfusion alone (group 1), LV unloading for 15 min (group 2), or LV unloading after reperfusion (group 4) were associated with reduced protein levels of SDF-1α within the infarct zone (see FIGS. 8A and 8B). In contrast, compared with sham controls, only LV unloading for 30 min before reperfusion (group 3) maintained SDF-1α protein levels within the infarct zone. CXCR4 levels remain unchanged across all 4 study groups compared with sham controls.

Figure 8C:
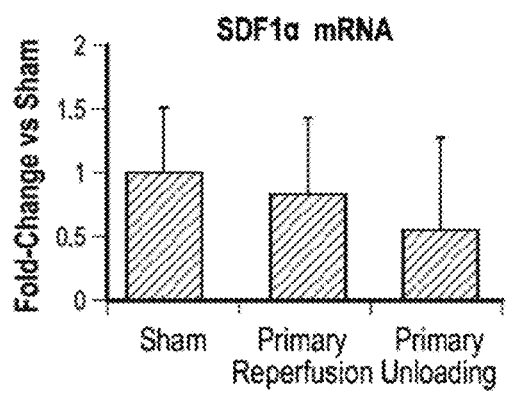
FIGS. 8C and 8D show quantification of mRNA levels of SDF1 and CXCR4 taken from sham controls and from tissue within the infarct zones of Group 1 and Group 3 (n=4 per group) of FIG. 8A.
Figure 8D:
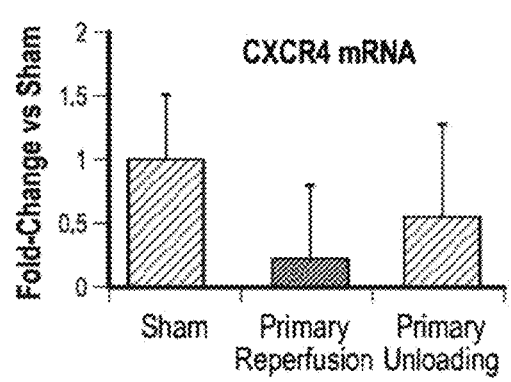
Figure 8E:
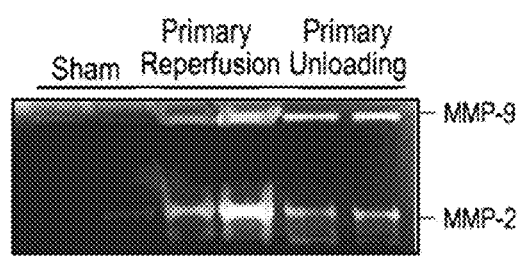
FIGS. 8E and 8F show quantification of mRNA levels of SDF1 and CXCR4 taken from sham controls and from tissue within the infarct zones of Group 1 and Group 3 (n=4 per group) of FIG. 8A.
Figure 8F:
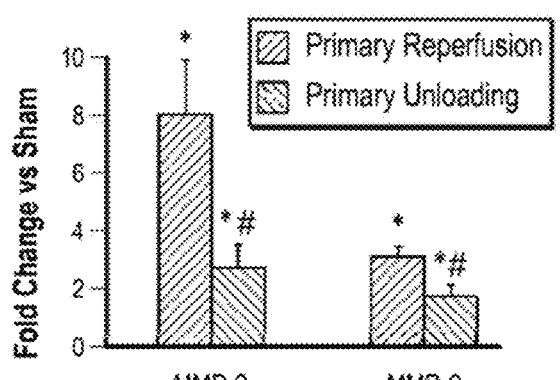
Figure 8G:
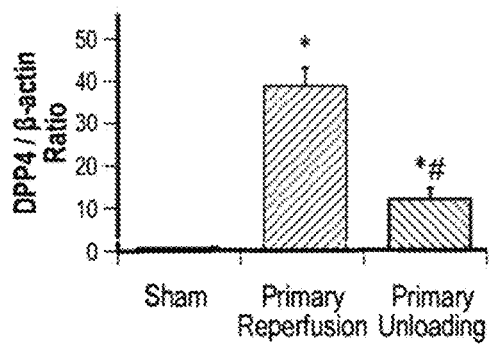
FIGS. 8G and 8H show quantification of dipeptidyl peptidase-4 (DPP4) protein levels and activity from samples taken from sham controls and the infarct zones of groups 1 and 3 (n=4 per group) of FIG. 8A, *p<0.05 versus sham, #p<0.05 versus group 1.
Figure 8H:
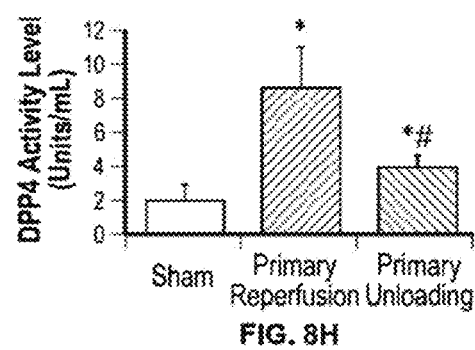

To determine whether increased SDF-1α levels are transcriptionally regulated, we quantified mRNA expression by using real-time PCR between groups and observed no difference in SDF-1α or CXCR4 gene expression (see FIGS. 8C and 8D). Because SDF-1α is highly regulated by proteolytic degradation, we next explored expression of key proteases known to degrade SDF-1α. Compared with sham controls, reperfusion alone increased MMP-2 and MMP-9 activity levels, but LV unloading for 30 min before reperfusion did not (see FIGS. 8E and 8F). Reperfusion alone increased DPP-4 expression and activity levels within the infarct zone compared with sham controls (see FIGS. 8G and 8H). LV unloading for 30 min before reperfusion limited up-regulation of DPP-4 expression and activity. These data suggest that LV unloading for 30 min before reperfusion may preserve SDF-1α protein levels by limiting the activity of proteases known to degrade SDF-1α.

Figure 8I:
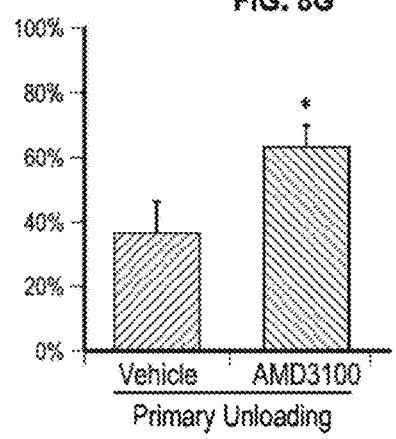
FIG. 8I shows quantification of infarct size as a percentage of the area at risk among groups subjected to LV unloading for 30 min with intracoronary delivery of either vehicle or the CXCR4 inhibitor AMD3100 followed by reperfusion (n=4 per group) using the method of FIG. 2.
Figure 8J:
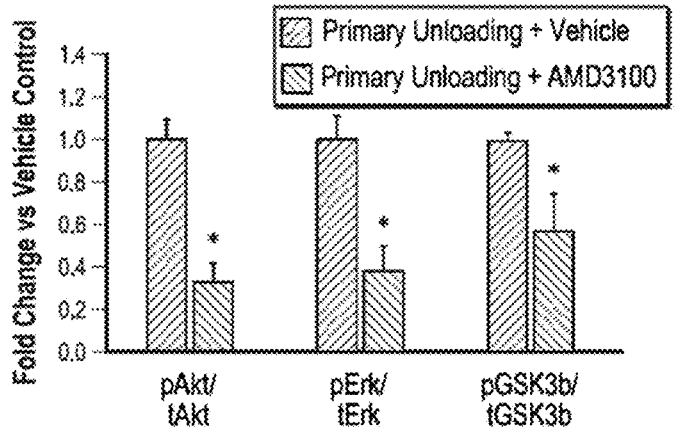
FIG. 8J shows quantification of phosphorylated and total Akt, phosphorylated and total extracellular-regulated kinase (ERK), and phosphorylated and total glycogen synthase kinase 3B (GSK3b) (n=4 per group) in the infarct zone after using the method of FIG. 2, *p<0.05 versus LV unloading+ vehicle.

B-4. Loss of SDF-1α/CXCR4 Activity Attenuates the Cardioprotective Effect of LV Unloading To explore whether SDF-1α/CXCR4 signaling is necessary for the cardioprotective effect of LV unloading, in a separate group of animals, we blocked CXCR4 activity using intracoronary delivery of AMD3100. Compared with vehicle-treated controls subjected to LV unloading for 30 min before reperfusion, loss of CXCR4 activity increased infarct size and reduced cardioprotective signaling via the RISK pathway, including Akt, extracellular-regulated kinase, and glycogen synthase kinase 3b (see FIGS. 8I and 8J). These findings suggest that SDF-1α/CXCR4 signaling is required for the cardioprotective effect of LV unloading before reperfusion.

B-5. LV Unloading Limits Proapoptotic Signaling

Figure 9A:
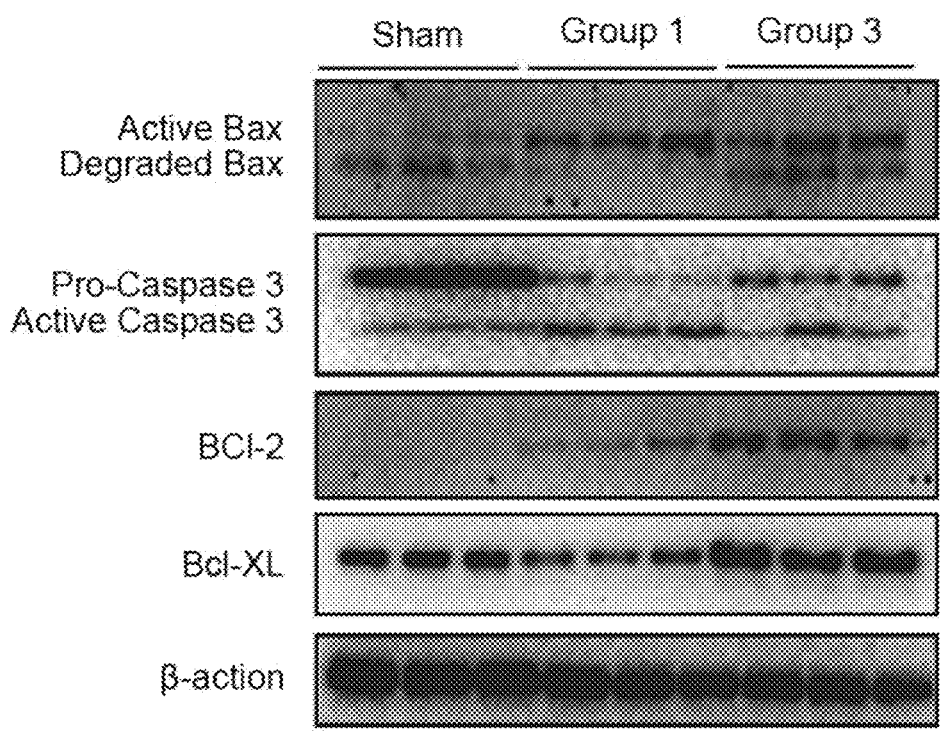
FIGS. 9A-9C show Western blots and corresponding quantification of left ventricular (LV) protein levels of pro-apoptotic (Bax, Caspase-3) and antiapoptotic (B-cell lymphoma-2 [BCL-2] and B-cell lymphoma-extra-large [BCL-XL]) normalized to beta-actin levels from sham controls and the infarct zones of groups 1 and 3 (n=3 per group) as defined in FIG. 8A, *p<0.05 versus sham: #p<0.05 versus group 1.
Figure 9B:
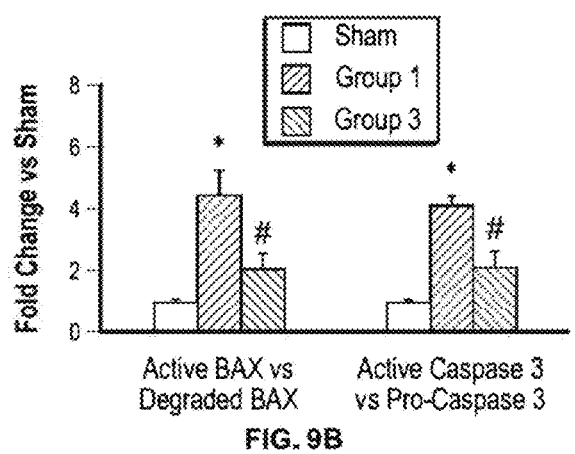
Figure 9C:
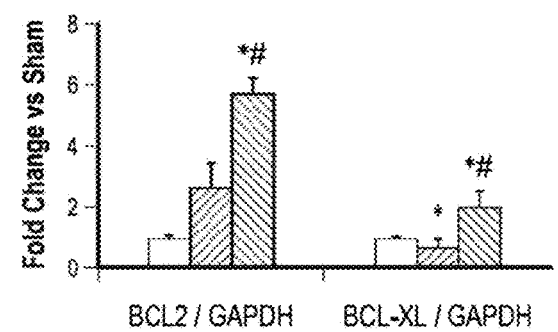
Figure 9D:
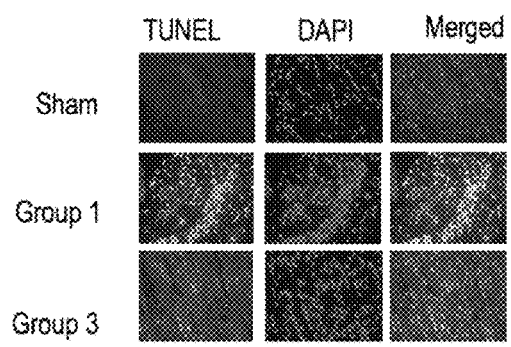
FIGS. 9D and 9E show TUNEL-positive staining for deoxyribonucleic acid fragmentation from LV tissue from sham controls and from within the infarct zone in group 1 and group 3 (n=3 per group) of FIG. 9A.
Figure 9E:
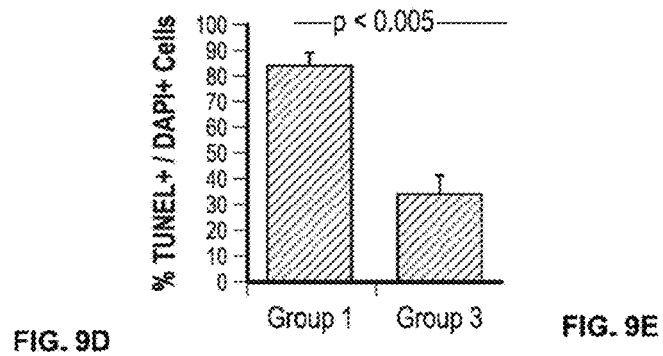

To further explore whether LV loading for 30 min reduces levels of proteins associated with apoptosis within the infarct zone, we observed that compared with sham controls, reperfusion alone (group 1) increased levels of proapoptotic proteins, including BAX and active caspase-3, and further reduced levels of antiapoptotic proteins, including BCL-2 and BCLXL (see FIGS. 9A to 9C). Compared with group 1, group 3 exhibited reduced levels of BAX and active caspase-3 and increased levels of the antiapoptotic BCL-2 and BCL-XL proteins. Compared to P-reperfusion, Punloading reduced the number of TUNEL-positive cells within the infarct zone (see FIGS. 9D and 9E).

B-6. Compared with Primary Reperfusion, Primary Unloading Reduces Myocardial Infarct Size and Preserves Cardiac Function 28 Days after AMI To confer clinically relevant cardioprotection, the observed effect of P-unloading on infarct size reduction must be maintained beyond the acute treatment phase. To test this theory, adult male swine were treated with either P-reperfusion or P-unloading, and LV scar size, LV function, and molecular changes associated with heart failure were quantified 28 days after MI. Fourteen animals completed the ischemiareperfusion phase of the protocol. Two animals in the P-reperfusion group died within 6 h after reperfusion and 12 animals survived to 28 days (6 per group).

Figure 5A:
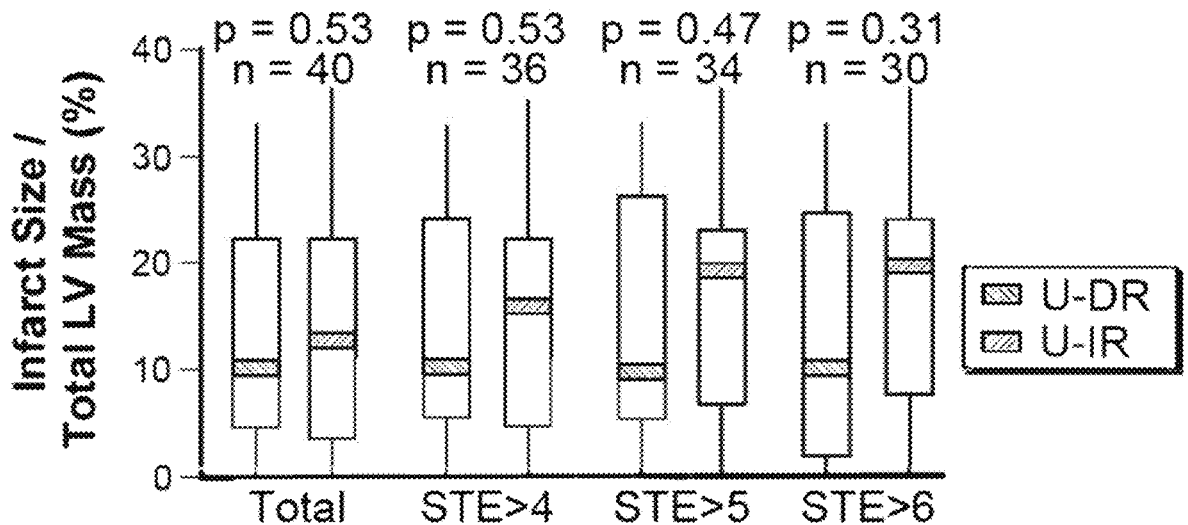
FIGS. 5A-5C show CMR box-whisker plots stratified by ST-elevation sum for the results of the study in Example 1 using the method of FIG. 2.
Figure 5B:
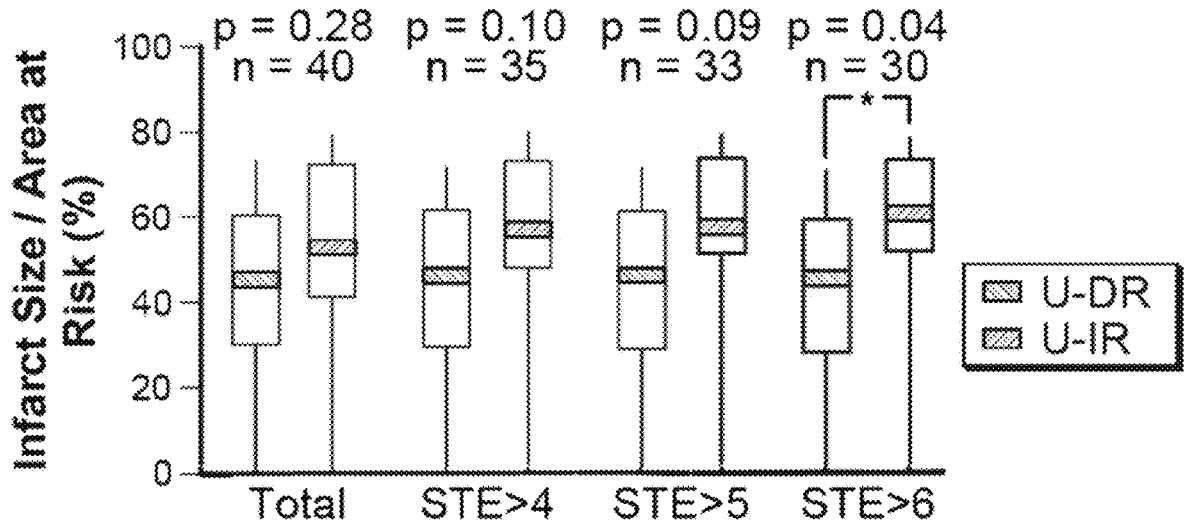
Figure 5C:
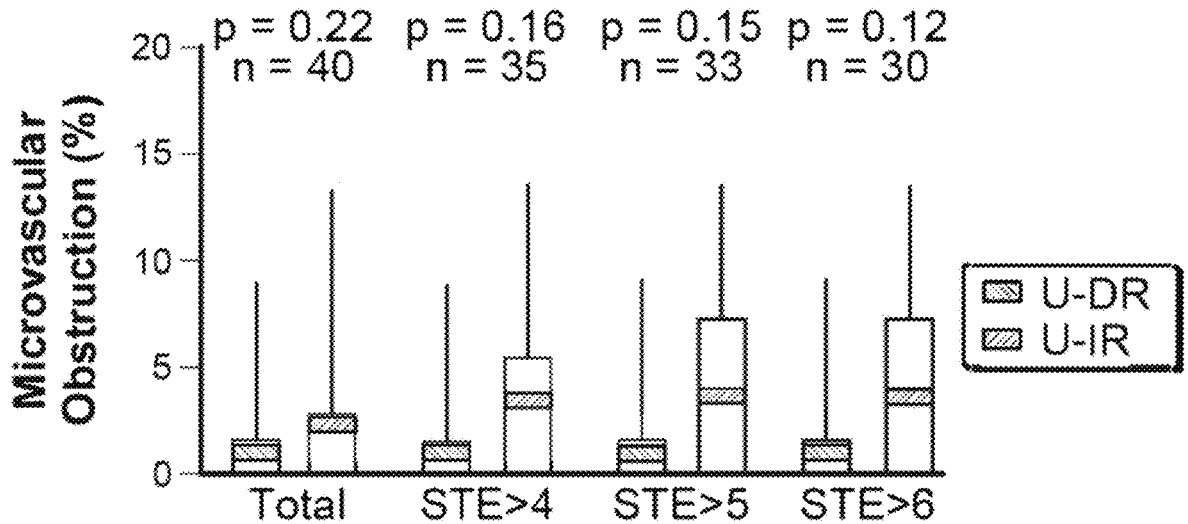
Figure 10A:
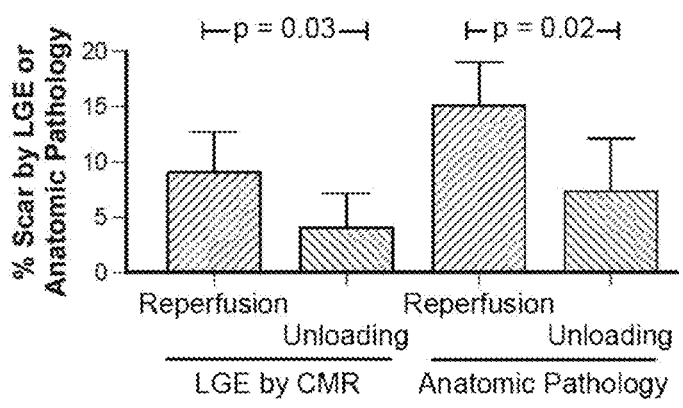
FIG. 10A shows quantification of LV scar size 28 days after either primary reperfusion or primary unloading using late gadolinium enhancement (LGE) by cardiac magnetic resonance imaging (CMR) or according to anatomic pathology (n=6 per group) in the infarct zone after using the method of FIG. 2.
Figure 10B:
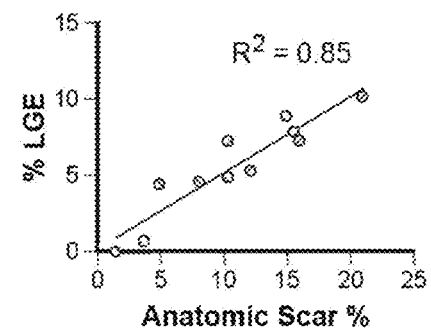
FIG. 10B shows regression plot showing correlation between LGE-CMR and anatomic pathologic quantification of LV scar size.
Figures 10C, 10D:
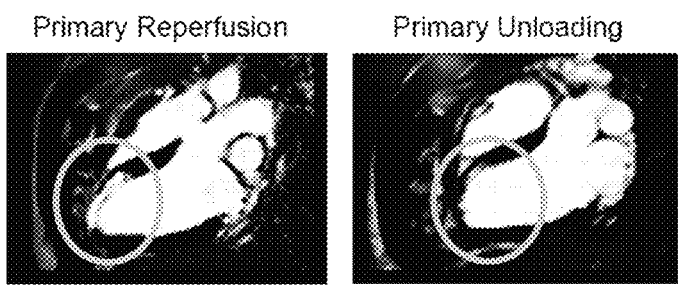
FIGS. 10C and 10D show representative CMR images showing LV scar within the blue or red circles.

Compared with P-reperfusion, P-unloading reduced LV scar size quantified by using LGE (3.9±3.2% vs. 9±3.7%; p=0.03) and anatomic pathology (7.2±4.9% vs. 14.9±4.1%: p=0.02) (FIG. 5A). Histological planimetry of infarct size correlated directly with percentage LGE from CMR (R2=0.85) (see FIGS. 10B to 10D). Using CMRderived volumes, end-diastolic volume and endsystolic volume were similar between groups (enddiastolic volume: 152±29 ml vs. 142±14 ml; Preperfusion vs. P-unloading [p=NS]: end-systolic volume: 86±26 ml vs. 74±6 ml; P-reperfusion vs. P-unloading [p=NS]). CMR-derived LV mass did not differ between groups (90.4±10.6 g vs. 84.4±8.6 g: P-reperfusion vs. P-unloading [p=NS]). Compared with P-reperfusion, hemodynamic analysis using LV conductance catheters showed that P-unloading was associated with higher stroke volume (54±7 ml vs. 40±6 ml: p=0.02), cardiac output (3.9±0.6 l/min vs. 2.5±0.2 l/min: p=0.006), and stroke work (3,075±339 ml×mm Hg vs. 2,195±307 ml×mm Hg: p=0.008) (see Table 5 below).

TABLE 5

Hemodynamic Variables 28 Days After Acute Myocardial Infarction

|  | Primary Reperfusion | Primary Unloading | p Value |
|---|---|---|---|
| Heart rate, beats/min | 63 ± 9 | 73 ± 12 | NS |
| LV EDV, ml | 190 ± 13 | 248 ± 54 | NS |
| LV ESV, ml | 150 ± 15 | 195 ± 47 | NS |
| LV stroke volume, ml | 40 ± 6 | 54 ± 7 | 0.02 |
| LV cardiac output, l/min | 2.5 ± 0.2 | 3.9 ± 0.6 | 0.006 |
| LV stroke work, ml × mm Hg | 2,195 ± 307 | 3,075 ± 339 | 0.008 |
| LV systolic pressure, mm Hg | 79 ± 3 | 78 ± 10 | NS |
| LV end-diastolic | 11.3 ± 2.5 | 7.4 ± 1.5 | 0.02 |

Figure 10E:
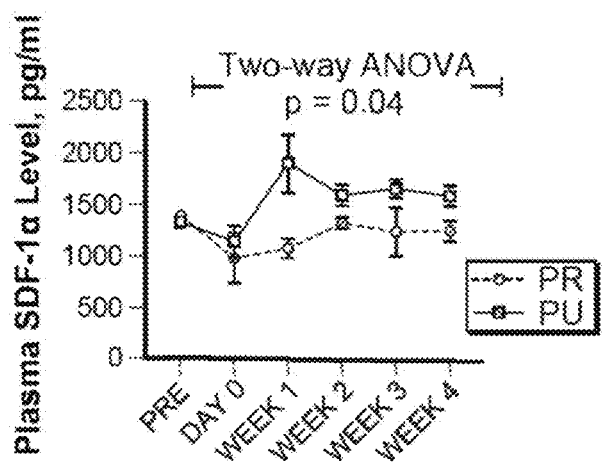
FIG. 10E shows circulating levels of SDF-1a over 28 days after either P-reperfusion (PR) or P-unloading (PU) (n=4 per group)
Figure 10F:
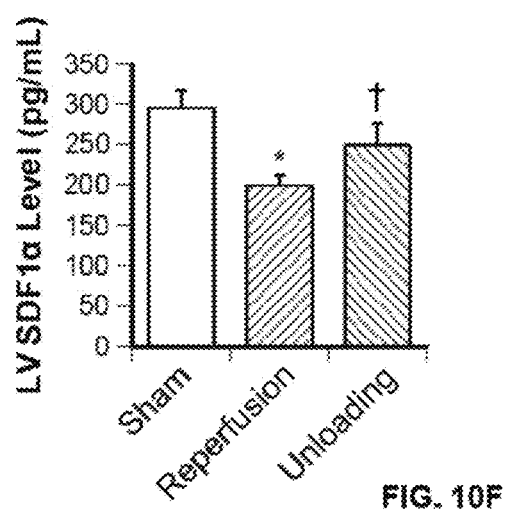
FIG. 10F shows protein levels of SDF-1a within the infarct zone 28 days after sham operation, P-reperfusion, or P-unloading (n=6 per group)
Figure 10G:
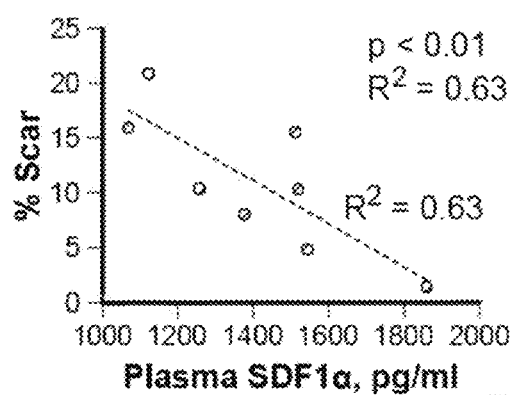
FIG. 10G shows regression plot showing the correlation between LV scar size as a percentage of the total left ventricle versus plasma SDF-1a levels 28 days after myocardial infarction. * p<0.05 versus sham: +p<0.05 versus P-reperfusion.

Values are mean ± SD
EDV = end-diastolic volume; ESV = end-systolic volume; LV = left ventricular; NS = not significant B-7. Primary Unloading Increases Circulating and Tissue Levels of SDF-1α Levels Acutely and 28 Days after AMI Compared with P-reperfusion, P-unloading increased circulating SDF-1α levels during the 28 days after AMI with a peak SDF-1α level 1 week after AMI (see FIG. 10E). In contrast, P-reperfusion failed to increase circulating SDF-1α levels at any time point after AMI. Compared with sham controls, P-reperfusion decreased SDF-1α protein levels within the infarct zone of the left ventricle, but P-unloading did not. Circulating SDF-1α levels on day 28 after AMI correlated inversely with LV scar size (see FIGS. 10F and 10G).

B-8. Primary Unloading Limits Maladaptive Cardiac Remodeling

Figure 11A:
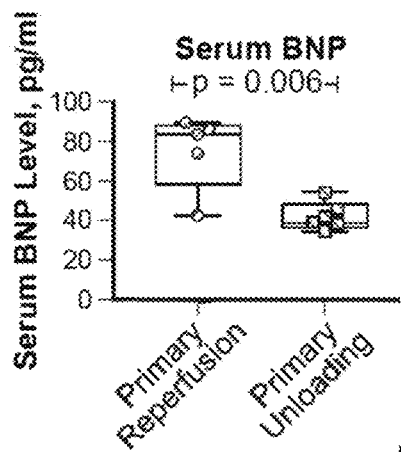
FIGS. 11A-11C show circulating levels, mRNA levels, and protein levels of B-type natriuretic peptide (BNP) from LV tissue (noninfarct zone) 28 days after primary reperfusion or primary unloading using the method of FIG. 2.
Figure 11B:
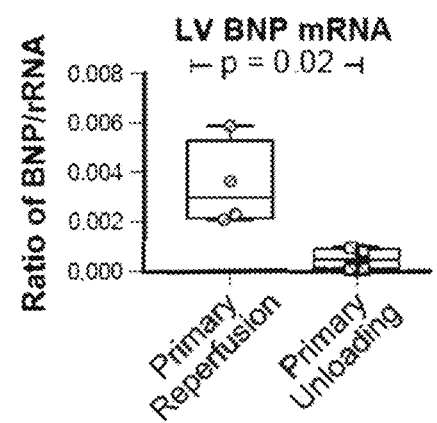
Figure 11C:
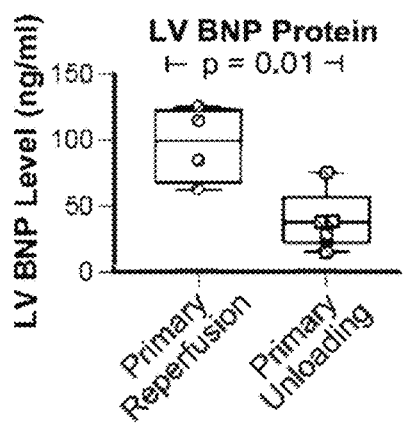
Figure 11D:
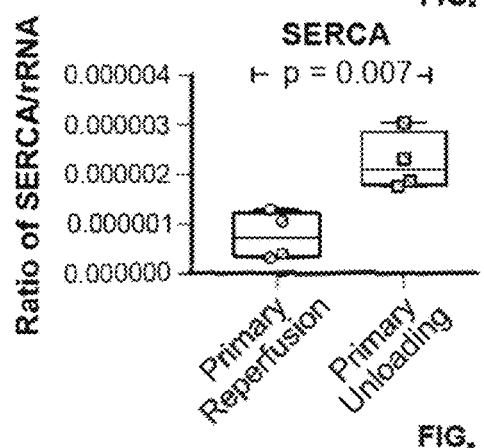
FIGS. 11D-11G show messenger ribonucleic acid (mRNA) levels of sarcoplasmic/endoplasmic reticulum calcium ATPase (SERCA), calcineurin, type I collagen (COL1), and beta-myosin heavy chain (b-MHC) from LV tissue (noninfarct zone) 28 days after primary reperfusion or primary unloading using the method of FIG. 2.
Figure 11E:
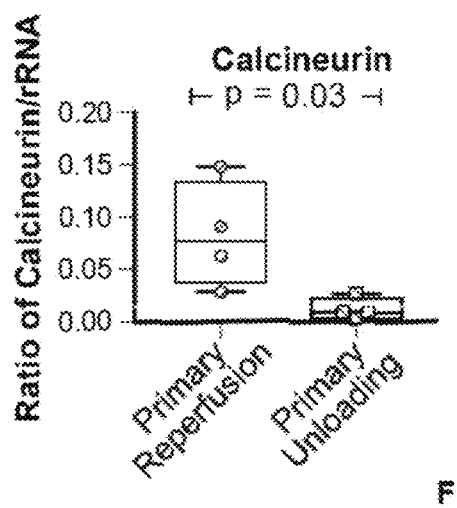
Figure 11F:
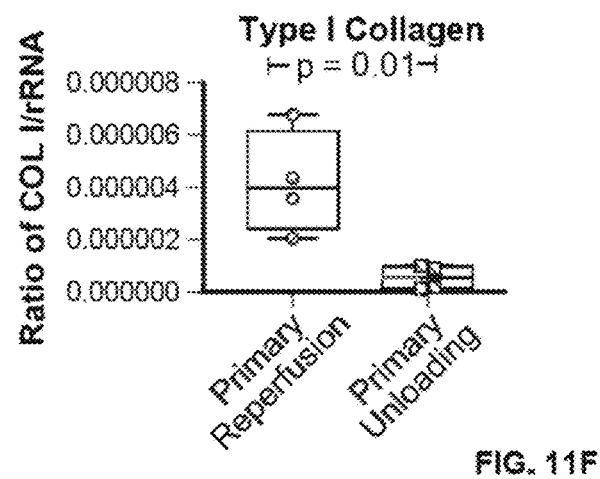
Figure 11G:
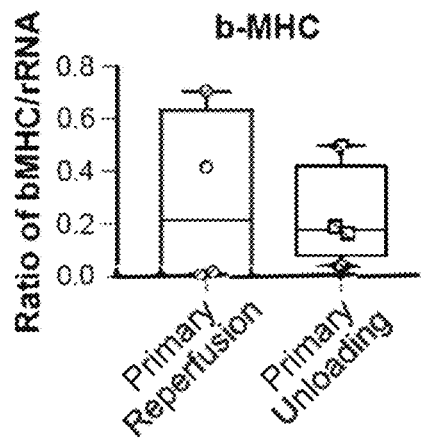

Compared with P-reperfusion, P-unloading reduced circulating levels of B-type natriuretic peptide (BNP) 28 days after AMI (see FIG. 11A). Compared with sham controls, P-reperfusion increased BNP mRNA and protein levels within the noninfarct zone (see FIGS. 11B and 11C). In contrast, P-unloading attenuated any increase in tissue levels of BNP within the noninfarct zone of the left ventricle. Compared with P-reperfusion, P-unloading increased mRNA levels of sarcoplasmic/endoplasmic reticulum calcium ATPase and reduced levels of calcineurin and type I collagen without affecting levels from the noninfarct region of the left ventricle (see FIGS. 11D to 11F).

C. Discussion

Figure 12:
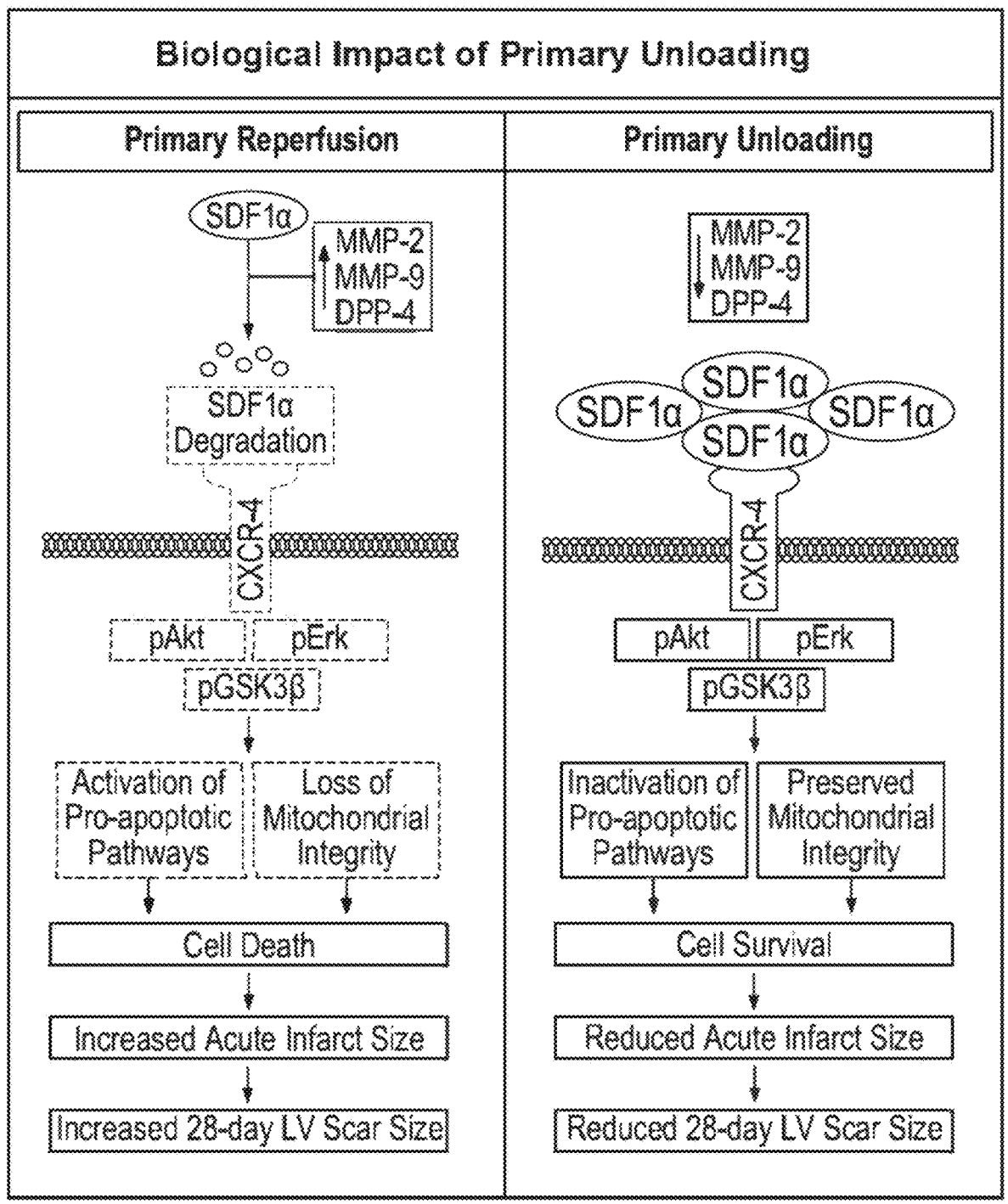
FIG. 12 illustrates schematically the effect of mechanically unloading the left ventricle for a minimum of 30 min before reperfusion which limits expression of proteolytic enzymes that degrades stromal-derived factor-1α (SDF1α), thereby increasing cardioprotective signaling improving cell survival, and reducing both acute infarct size and subsequent myocardial scar size 28 days after acute myocardial infarction. DPP-4=dipeptidyl peptidase-4: LV=left ventricular: MMP=matrix metalloproteinase.

The central finding of this example is that P-unloading for 30 min before reperfusion alters several key biological pathways involving cellular respiration and post-translation regulation of SDF-1α levels, thereby reducing acute infarct size, as shown in FIG. 12. Furthermore, P-unloading reduced LV scar size and improved cardiac function 28 days after AMI. Specifically, we report that: 1) 30 min of P-unloading is necessary and sufficient before reperfusion to limit infarct size: 2) P-unloading triggers a global shift in gene expression associated with protection of mitochondrial integrity within the infarct zone: 3) compared with P-reperfusion, P-unloading for 30 min preserves SDF-1α protein levels without changing SDF-1α mRNA levels within the infarct zone and further promotes a shift toward antiapoptotic signaling within the infarct zone: 4) P-unloading reduces activity levels of proteases known to degrade SDF-1α; and 5) P-unloading reduces LV scar size, preserves cardiac output, reduces BNP expression, and limits expression of genes and proteins associated with maladaptive remodeling within the noninfarct zone 28 days after AMI. This data identifies P-unloading as a novel approach to enhance cardioprotective mechanisms that may preserve cardiac function after AMI.

It was identified that 30 min of mechanical LV unloading with a TV-pump before, not after, reperfusion limits acute infarct size. This observation suggests for the first time that LV unloading itself may be a therapy as opposed to simply an adjunct supportive approach for a dysfunctional left ventricle. One potential explanation for the beneficial effects of 30 min of mechanical LV unloading before reperfusion is that LV unloading biologically primes the myocardium for reperfusion. A potential explanation of the impact of unloading the LV is that it can reduce infarct size and increase protein levels of SDF-1α within the infarct zone.

Using a genomics approach, it was identified that compared with P-reperfusion, P-unloading for 30 min differentially alters expression of >600 genes within the infarct zone. Pathway analysis identified that P-unloading preserved expression of genes associated with cellular respiration and mitochondrial integrity. It was confirmed that these observations with direct quantification of select genes from each component of the electron transport chain involved in cellular respiration. The findings of this study indicate that initiation of LV unloading before reperfusion may limit the impact of ischemiareperfusion injury on mitochondrial integrity, thereby promoting cardiomyocyte survival.

In this study, it was observed that compared with P-reperfusion, P-unloading failed to increase SDF-1α mRNA levels within the infarct zone. However, it was observed that compared with sham controls, P-reperfusion reduced SDF-1α protein levels within the infarct zone. In contrast, LV unloading for 30 min before reperfusion preserved SDF-1α protein levels.

Because SDF-1α levels are highly regulated by proteases associated with inflammation, we next explored whether protein and activity levels of key regulatory proteases such as MMP-2, MMP-9, or DPP-4 were altered by P-reperfusion and P-unloading. It was observed that compared with sham controls, P-reperfusion increases, but P-unloading attenuates, activity of these proteases. To further establish the downstream effect of P-unloading, we also observed reduced expression of proteins associated with apoptosis within the infarct zone. These findings suggest for the first time that 30 min of P-unloading limits protease activity within the infarct zone, which limits SDF-1α degradation in the setting of an AMI.

A preclinical study was designed in which animals were assigned to P-reperfusion or P-unloading and then quantified LV scar 28 days later by using cardiac MRI. It was observed for the first time that P-unloading reduced infarct scar size as blindly quantified by LGE-CMR, which tightly correlated with anatomic measurements of myocardial scar size. Well-established molecular markers of maladaptive remodeling in the noninfarct zones were then quantified where the bulk of compensatory remodeling would occur in response to a large anterior MI. It was observed that compared with P-reperfusion, P-unloading reduced calcineurin, beta myosin heavy chain, and BNP levels, while preserving sarcoplasmic/endoplasmic reticulum calcium ATPase levels 28 days after AMI. Furthermore, circulating and LV tissue levels of a clinically relevant biomarker of heart failure, BNP, were reduced after P-unloading but not after P-reperfusion. These findings are the first to identify that use of a transvalvular pump at the time of AMI has durable effects on both LV scar size and markers of maladaptive remodeling 28 days later.

For decades, immediate reperfusion in AMI was the main focus: however, these data suggest for the first time that the "pre-reperfusion time period" is a critical moment that may allow for interventions such as LV unloading and delayed reperfusion to have a durable effect on late-term cardiac remodeling.

Finally, SDF-1α levels after AMI were quantified and an increase in circulating and LV tissue levels of SDF-1α levels 28 days after P-unloading but not after P-reperfusion was observed. Circulating SDF-1α levels correlated inversely with LV scar size. These findings identify that in addition to providing an acute reduction in infarct size after MI, P-unloading promotes a more durable reduction in LV scar size, improves cardiac function, and limits maladaptive remodeling after AMI. By using clinically relevant biomarkers of myocardial injury, including CMR and circulating BNP levels, the findings of this study suggests a strong translational potential for P-unloading as an approach to limit ischemic heart failure after AMI. D. FINDINGS The findings of this study show that activation of a transvalvular, micro-axial flow pump for 30 min before reperfusion, as in the method 200 of FIG. 2 described in the foregoing, limits both acute infarct size and subsequent scar size compared with P-reperfusion alone. The results of this study provide a new mechanistic insight into the biological impact of myocardial unloading and activation of cardioprotective pathways within the infarct zone.

The foregoing is merely illustrative of the principles of the disclosure, and the apparatuses can be practiced by other than the described implementations, which are presented for purposes of illustration and not of limitation.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

The invention claimed is:

1. A method of supporting a heart of a human patient that has sustained myocardial infarction, the method comprising the steps of:
measuring an ST Segment Elevation Sum (ΣSTE) of the heart of the human patient after the myocardial infarction, wherein the ΣSTE is greater than 6 mm;
inserting a mechanical circulatory support device into the human patient after the myocardial infarction, the mechanical circulatory support device comprising a microaxial blood pump with an onboard motor and a cannula inserted into the heart of the human patient across a valve, wherein the ΣSTE of the heart of the human patient is greater than 6 mm;
operating the mechanical circulatory support device continuously for an initial support period of from 30 minutes to less than 60 minutes, at a rate of at least 2.5 L/min of blood flow; and
at conclusion of the initial support period, applying a coronary reperfusion therapy to the heart of the human patient,
wherein operating the mechanical circulatory support device continuously for the initial support period occurs prior to applying the coronary reperfusion therapy.

2. The method of claim 1, wherein the mechanical circulatory support device is operated at the rate of at least 3.5 L/min of blood flow.

3. The method of claim 1, wherein after the initial support period, the heart of the human patient is unloaded by the mechanical circulatory support device concurrently with applying the coronary reperfusion therapy.

4. The method of claim 1, further comprising the step of supporting the heart of the human patient by an intra-aortic balloon pump or an extracorporeal membrane oxygenation (ECMO) pump, in combination with the mechanical circulatory support device.

5. The method of claim 1, wherein the coronary reperfusion therapy comprises at least one of primary percutaneous coronary intervention (PCI) and fibrinolysis.

6. The method of claim 1,
wherein the microaxial blood pump is percutaneously inserted into the human patient and positioned in the heart of the human patient across the valve, wherein the valve is aortic valve, with a distal end of the microaxial blood pump located in left ventricle of the heart of the human patient, and
wherein prior to applying the coronary reperfusion therapy, the microaxial blood pump is operated to unload the left ventricle of the heart of the human patient at the rate of at least 2.5 L/min of blood flow for the initial support period of from 30 minutes to less than 60 minutes.

7. The method of claim 6, further comprising the step of:
removing the microaxial blood pump from the heart of the human patient after applying the coronary reperfusion therapy.

8. The method of claim 1, wherein the mechanical circulatory support device is inserted percutaneously into the human patient.

9. The method of claim 1, wherein the method results in at least one of:
a reduction in levels of BAX protein and active Caspase-3 antibody in cardiac tissue near the myocardial infarction; and
an increase in levels of BCL-2 and BCL-XL proteins in cardiac tissue near the myocardial infarction.

10. The method of claim 1, wherein the method results in at least one of:
an increase in stromal derived factor 1α (SDF-1α) protein levels in cardiac tissue near the myocardial infarction;
a maintenance of activity levels of MMP-2 and MMP-9 enzymes in cardiac tissue near the myocardial infarction; and
a limitation on upregulation of DPP-4 protein expression and activity in cardiac tissue near the myocardial infarction.

11. The method of claim 1, wherein the method results in at least one of:
a reduction in circulating levels of brain natriuretic peptide (BNP) in blood of the human patient;
an increase in mRNA levels of SERCA expression in cardiac cells near the myocardial infarction; and
a reduction in levels of calcineurin activity and Type I collagen in cardiac tissue near the myocardial infarction while maintaining levels of b-MHC in a non-infarct region of the heart of the human patient.

12. The method of claim 1, wherein an infarct size normalized to an area at risk measured between 3 and 5 days following the coronary reperfusion therapy is about 44.1%.

13. The method of claim 12, wherein the infarct size is measured using a cardiac magnetic resonance (CMR).

14. The method of claim 1, wherein the ΣSTE was measured by measuring magnitude of ST-segment elevation 0.08 seconds after a J-point across precordial leads.

15. A method of preventing or limiting effects of heart failure in a human patient that has sustained myocardial infarction by reducing maladaptive cardiac remodeling in the human patient, the method comprising the steps of:
    measuring an ST Segment Elevation Sum (ΣSTE) of a heart of the human patient after the myocardial infarction, wherein the ΣSTE is greater than 6 mm;
    percutaneously inserting into a vasculature of the human patient a microaxial blood pump comprising an onboard motor with a rotor and a stator, and a cannula, and positioning the cannula across aortic valve of the heart of the human patient, with a distal end of the cannula located in left ventricle of the heart of the human patient and a proximal end of the microaxial blood pump located in aorta, wherein the ΣSTE of the heart of the human patient is greater than 6 mm;
    operating the microaxial blood pump continuously for an initial support period of from 30 minutes to less than 60 minutes to unload the left ventricle of the heart of the human patient at a pumping rate of at least 2.5 L/min of blood flow; and
    at conclusion of the initial support period, applying a coronary reperfusion therapy to the heart of the human patient,
    wherein operating the microaxial blood pump continuously for the initial support period occurs prior to applying the coronary reperfusion therapy.

16. The method of claim 15, wherein the microaxial blood pump is operated at the pumping rate of at least 3.5 L/min of blood flow.

17. The method of claim 15, comprising the step of:
    after the initial support period, continuing operating the microaxial blood pump in parallel with applying the coronary reperfusion therapy.

18. The method of claim 15, comprising the step of:
    after the initial support period, continuing operating the microaxial blood pump in parallel with applying the coronary reperfusion therapy for a total support period of at least 3 hours.

19. The method of claim 15, wherein the method results in:
    a reduction of at least one of: infarct size and left ventricle scar size.

20. The method of claim 15, wherein the method results in at least one of:
    a reduction in levels of BAX protein and active Caspase-3 antibody in cardiac tissue near the myocardial infarction;
    an increase in levels of BCL-2 and BCL-XL proteins in cardiac tissue near the myocardial infarction;
    an increase in stromal derived factor 1α (SDF-1α) protein levels in cardiac tissue near the myocardial infarction;
    a maintenance of activity levels of MMP-2 and MMP-9 enzymes in cardiac tissue near the myocardial infarction;
    a limitation on upregulation of DPP-4 protein expression and activity in cardiac tissue near the myocardial infarction;
    a reduction in circulating levels of brain natriuretic peptide (BNP) in blood of the human patient;
    an increase in mRNA levels of SERCA expression in cardiac cells near the myocardial infarction; and
    a reduction in levels of calcineurin activity and Type I collagen in cardiac tissue near the myocardial infarction while maintaining levels of b-MHC in a non-infarct region of the heart of the human patient.

21. The method of claim 15, wherein the coronary reperfusion therapy comprises at least one of: primary percutaneous coronary intervention (PCI) and fibrinolysis.

22. The method of claim 21, wherein the PCI comprises implanting a stent in the human patient.

\* \* \* \* \*